(12) United States Patent
Baker et al.

(10) Patent No.: US 10,584,827 B2
(45) Date of Patent: Mar. 10, 2020

(54) OVERHEAD SUPPORT STRUCTURE FOR INTELLIGENT LOCOMOTION FOR OBJECTS AND EQUIPMENT ALONG TWO OR MORE AXES OF MOVEMENT

(71) Applicant: ABL IP Holding LLC, Conyers, GA (US)

(72) Inventors: Youssef F. Baker, Arlington, VA (US); Sean P. White, Reston, VA (US); Daniel M. Megginson, Fairfax, VA (US); Jenish S. Kastee, South Riding, VA (US); Nathaniel W. Hixon, Arlington, VA (US); Niels G. Eegholm, Columbia, MD (US); David P. Ramer, Reston, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 253 days.

(21) Appl. No.: 15/674,119

(22) Filed: Aug. 10, 2017

(65) Prior Publication Data
US 2019/0049064 A1  Feb. 14, 2019

(51) Int. Cl.
*F16M 13/02* (2006.01)
*B60M 1/34* (2006.01)
(Continued)

(52) U.S. Cl.
CPC ............ *F16M 13/027* (2013.01); *B60M 1/34* (2013.01); *F16M 11/18* (2013.01);
(Continued)

(58) Field of Classification Search
CPC .... B61B 3/00; B61B 3/02; B61B 5/00; B61B 5/02; B61B 13/00
See application file for complete search history.

(56) References Cited

U.S. PATENT DOCUMENTS

| 2,469,575 A | 5/1949 | Ralston et al. |
| 2,905,806 A | 9/1959 | Tunney |

(Continued)

FOREIGN PATENT DOCUMENTS

WO     8909320 A1    10/1989

OTHER PUBLICATIONS

Non Final Office Action for U.S. Appl. No. 15/674,093, dated May 31, 2019, 29 pages.
(Continued)

*Primary Examiner* — Robert J McCarry, Jr.
(74) *Attorney, Agent, or Firm* — RatnerPrestia

(57) ABSTRACT

A support structure provides two or more axes of intelligent locomotion for a movable object on the support structure. The support structure can include a track system made up of a plurality of identically configured track modules that are connected end-to-end. Each track module can include an elongated body defining a longitudinal axis and having two ends. Each end can include at least one beveled edge and at least one track surface extending longitudinally along the elongated body. The track surface can include a plurality of protuberances arranged in rows that are parallel to the longitudinal axis of the elongated body, and in columns that are perpendicular to the longitudinal axis of the elongated body. The track modules can be connected to a power source and include electrical contacts that provide electricity to self-propelled units that travel along the track system.

18 Claims, 16 Drawing Sheets

(51) Int. Cl.
*F16M 11/42* (2006.01)
*F16M 11/18* (2006.01)
*B66C 6/00* (2006.01)

(52) U.S. Cl.
CPC ........ *F16M 11/425* (2013.01); *F16M 13/022* (2013.01); *B66C 6/00* (2013.01)

(56) References Cited

U.S. PATENT DOCUMENTS

| | | | |
|---|---|---|---|
| 2,943,579 | A | 7/1960 | Bel Geddes |
| 4,732,087 | A | 3/1988 | Morishita et al. |
| 5,857,413 | A | 1/1999 | Ward |
| 6,209,610 | B1 | 4/2001 | Davies et al. |
| 6,315,138 | B1 * | 11/2001 | Dyson ................ A61G 7/1015 104/89 |
| 2004/0084545 | A1 * | 5/2004 | Pyrce .................... A63H 18/02 238/10 A |
| 2005/0098059 | A1 | 5/2005 | Wallner |
| 2007/0133207 | A1 | 6/2007 | Pryor |
| 2007/0285949 | A1 | 12/2007 | Lodhie et al. |
| 2010/0038041 | A1 | 2/2010 | Liao |
| 2010/0067244 | A1 | 3/2010 | Cartwright |
| 2013/0327913 | A1 | 12/2013 | Fruhm |
| 2014/0263866 | A1 | 9/2014 | Hemmer |
| 2014/0369061 | A1 | 12/2014 | Kim |
| 2015/0198311 | A1 | 7/2015 | O'Brien et al. |
| 2016/0018092 | A1 | 1/2016 | Knaapen et al. |
| 2016/0033098 | A1 | 2/2016 | Bergman et al. |
| 2016/0033099 | A1 | 2/2016 | Bergman et al. |
| 2016/0246040 | A1 | 8/2016 | Jurik et al. |
| 2017/0074476 | A1 | 3/2017 | Jurik et al. |

OTHER PUBLICATIONS

Final Office Action for U.S. Appl. No. 15/674,093, dated Nov. 22, 2019, 31 pages.

* cited by examiner

OVERHEAD SUPPORT STRUCTURE FOR INTELLIGENT LOCOMOTION FOR OBJECTS AND EQUIPMENT ALONG TWO OR MORE AXES OF MOVEMENT

TECHNICAL FIELD

The disclosed technologies relate generally to overhead support structures for objects and equipment, and more particularly to a track system that allows for intelligent locomotion of objects and equipment along two or more axes of movement.

BACKGROUND

Commercial and industrial spaces often have equipment mounted from the ceiling to service spaces below the equipment. In many cases, the equipment is installed above the space in one location where they service the entire space.

Conventional lighting systems for commercial spaces often feature one or more light fixtures that are installed in a ceiling or overhead support structure. The lighting fixtures can be arranged in a variety of configurations designed to provide the appropriate amount of light, and the appropriate distribution of that light, throughout the space. Once the lighting arrangement is installed, the options for changing the amount of light and distribution of light in the space are fairly limited. This can create challenges, particularly in multi-use spaces that are used for different purposes or events, where each purpose or event has its own unique lighting needs, and where the space must be reconfigured from one purpose or event to another purpose or event on a frequent basis.

Conventional track lights allow the user to manually change the position of an otherwise stationary light fixture, but only within the limited confines of the track, which is typically linear and limited in length. Some track lights also allow the user to pivot the light fixture in place, so as to change the direction of illumination from that location on the track. Manual adjustment of individual light fixtures in a large space containing several light fixtures can be labor intensive and require a significant amount of downtime where the space cannot be used. For this reason, manually adjustable track lights are not preferred for spaces that are frequently reconfigured for different purposes.

SUMMARY

Support structures described by way of example herein resolve some or all of the drawbacks of conventional overhead mounting arrangements by allowing equipment or other overhead objects to be moved and rearranged along two or more axes of movement. In one example, a track system is configured for installation over a space. One or more autonomous self-propelled units, each carrying a piece of equipment or object, travel on the track system. Each self-propelled unit can move along multiple axes on the track system to reposition and reorient the piece of equipment or object that it carries.

In a first example, a track module includes an elongated body defining a longitudinal axis and having two ends. Each end includes at least one beveled edge. The track module also includes at least one track surface extending longitudinally along the elongated body. The at least one track surface includes a plurality of protuberances arranged in rows and in columns. The rows are parallel to the longitudinal axis of the elongated body, and the columns are perpendicular to the longitudinal axis of the elongated body. The track module is configured for connection with another track module to construct a track system that provides two axes of intelligent locomotion for a self-propelled unit on the track system.

In a second example, a track system includes a plurality of track modules connected end-to-end. Each track module includes an elongated body defining a longitudinal axis and having two ends. Each end includes at least one beveled edge. The track modules also includes at least one track surface extending longitudinally along the elongated body. The at least one track surface includes a plurality of protuberances arranged in rows and in columns. The rows are parallel to the longitudinal axis of the elongated body, and the columns are perpendicular to the longitudinal axis of the elongated body. The track system provides two axes of intelligent locomotion for a self-propelled unit on the track system.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations by way of example only, not by way of limitations. In the figures, like reference numerals can refer to the same or similar elements.

DETAILED DESCRIPTION

Figure 1:
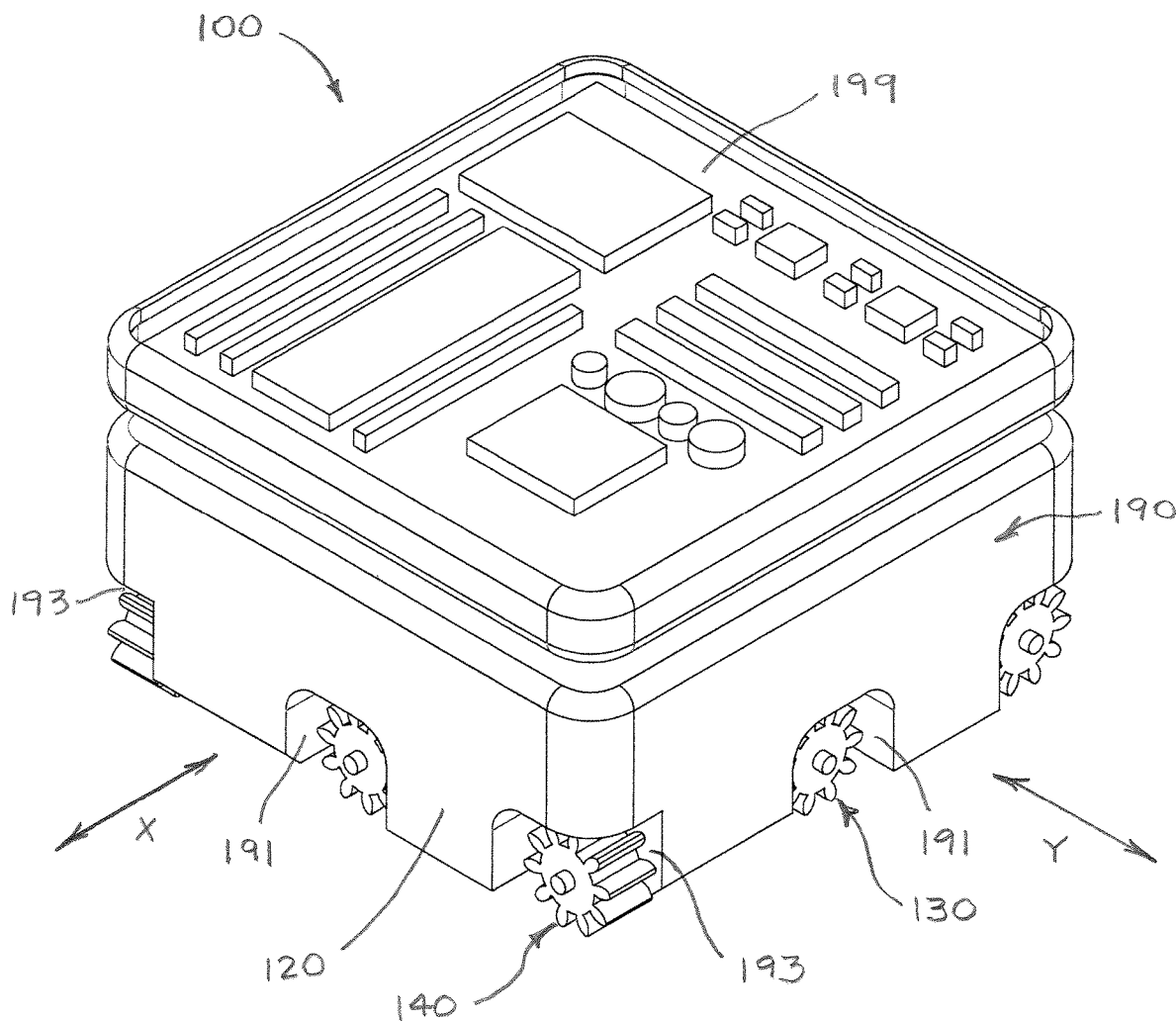
FIG. 1 is a perspective view of a self-propelled unit.
Figure 2:
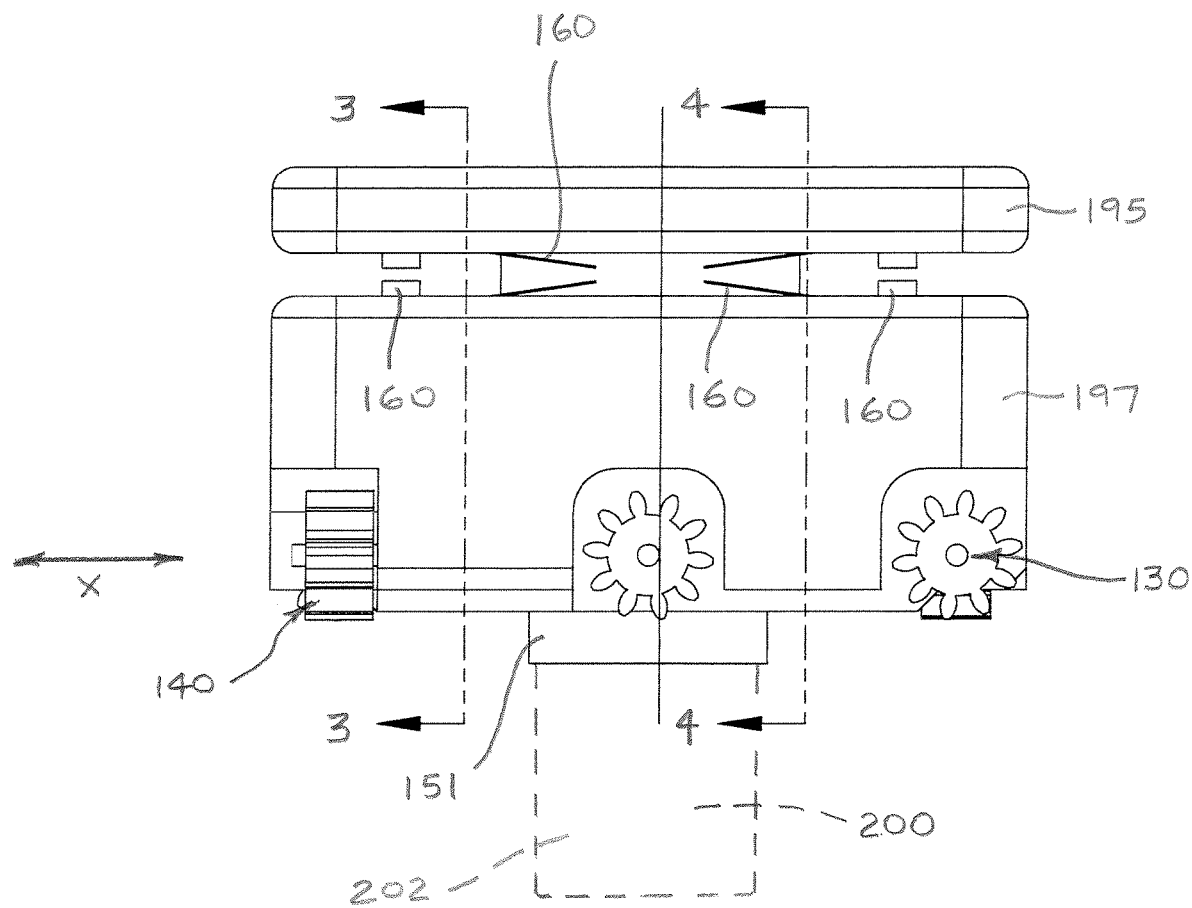
FIG. 2 is a side view of the self-propelled unit of FIG. 1.
Figure 3:
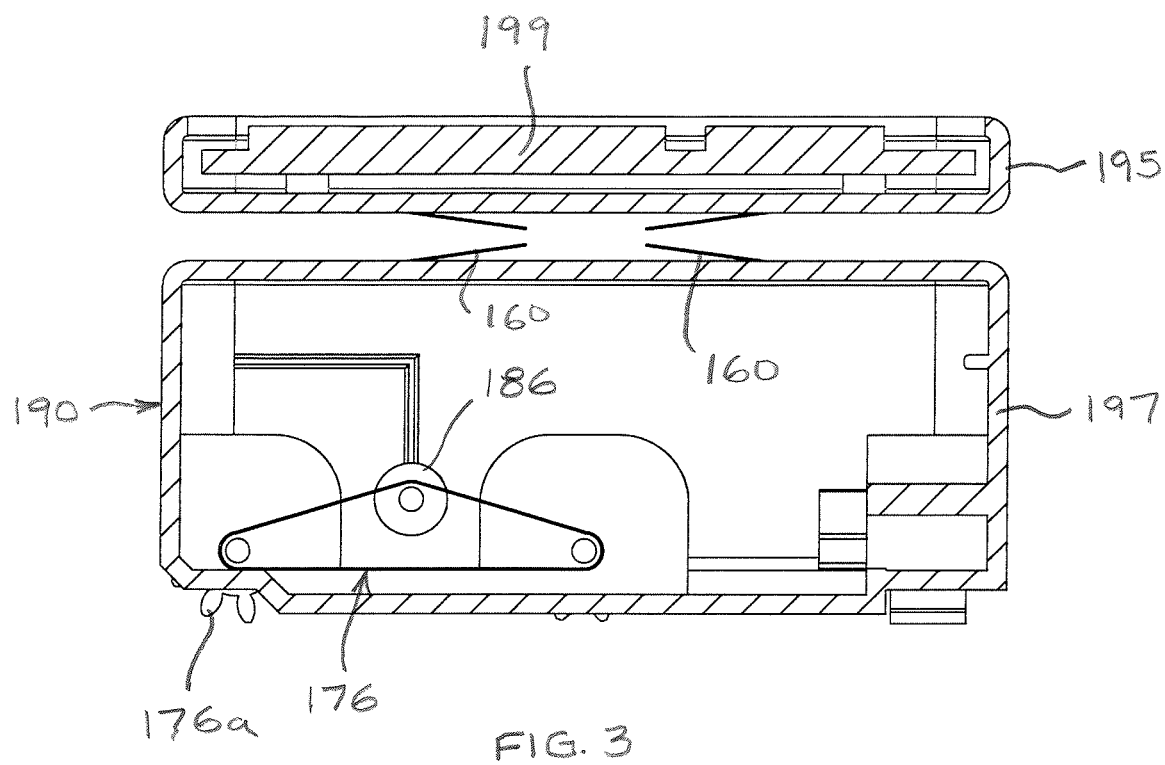
FIG. 3 is a cross section view of the self-propelled unit of FIG. 2, taken through line 3-3 in FIG. 2.
Figure 4:
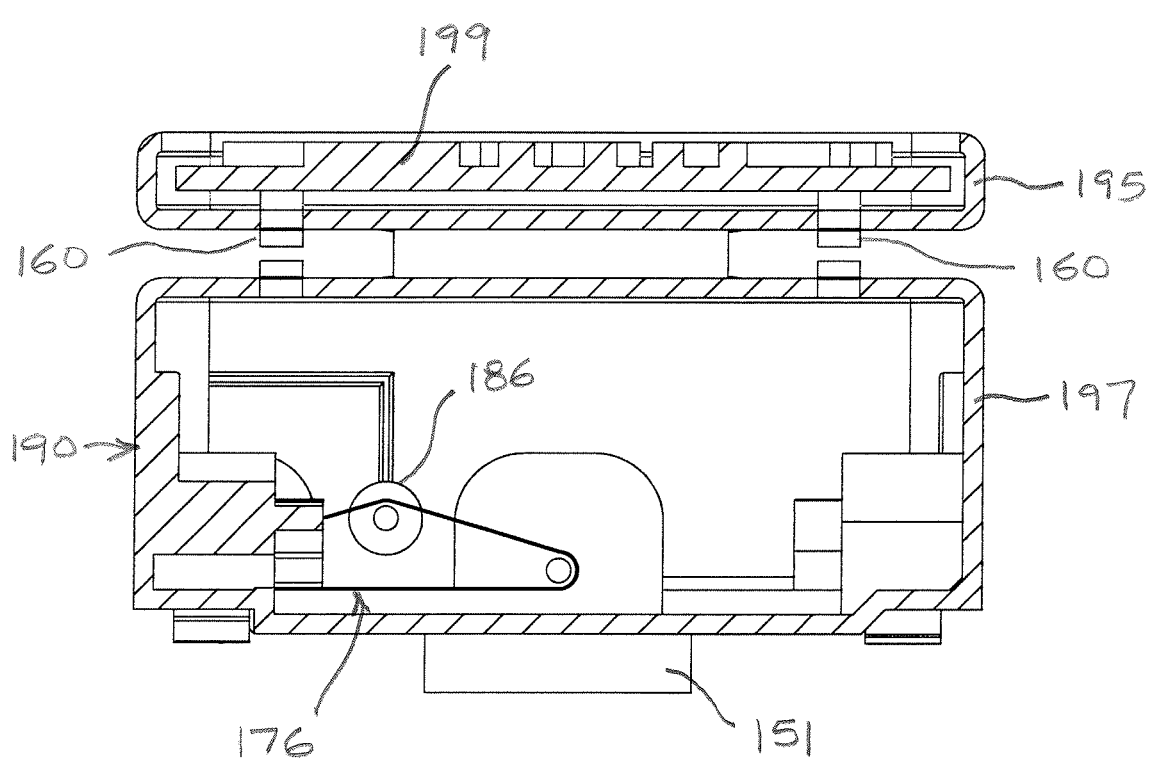
FIG. 4 is a cross section view of the self-propelled unit of FIG. 2, taken through line 4-4 in FIG. 2.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Apparatuses and systems described below and shown in the drawings, by way of examples, can include various types of self-propelled units that are configured to support objects on a support structure above a space. Such self-propelled units are operable to travel on the support structure to move objects to desired locations on the support structure based on an instruction from a user, or an input received from a system controller.

Various types of support structures can also be utilized, including but not limited to a two dimensional grid layout comprising support elements arranged in evenly-spaced rows and columns. As an alternative, the support structure can comprise support elements arranged in an irregular arrangement with evenly-spaced or unevenly-spaced rows and columns. Irregular arrangements can be designed with a symmetrical or asymmetrical layout of support elements.

Support elements can include various structures suitable for navigating and conveying a unit along a desired route, including but not limited to various types of tracks, rails, beams, channels, tubes and other conveyance means. These tracks, rails, beams, channels, tubes and other conveyance means can be used alone or in any combination to form a support structure that permits movement along two or more axes of movement. For example, support structures can be in the form of a substantially horizontal support system that allows the self-propelled unit to travel along only two axes of movement (a "two-dimensional support structure"). Alternatively, support structures can include sloped elements or members that create vertically ascending and descending sections in the support structure that allow for three axes of movement (a "three-dimensional support structure"). Self-propelled units can also include on-board mechanisms and assemblies for vertically raising and lowering equipment or objects relative to the support structure, such as pendant lights that are suspended from self-propelled units with aircraft cable or other means.

Self-propelled units can move on support structures in two dimensions exclusively by translation. That is, each self-propelled unit maintains the same orientation relative to the support structure as its direction of movement changes. In this arrangement, the self-propelled unit never rotates when changing direction at an intersection.

Apparatuses and systems can be used to support, carry and reposition many types of objects on a support structure, with applications including but not limited to lighting, signage, displays, HVAC, decorations, Wi-Fi, location service, anchors, disability services, audio components, store guidance, immersive entertainment lighting, UV cleaning, custodial, power distribution, stand-alone sensor packs, projectors, security/surveillance equipment, and air handling. In the case of lighting, apparatuses and systems can support, carry and reposition a light source, which can include one or more light emitting diodes (LEDs), a fluorescent lamp, an incandescent lamp, a halide lamp, a halogen lamp, or other type of light source. As such, self-propelled units can include different mechanisms for supporting different objects and loads, as well as different mechanisms for traveling on a support structure. Furthermore, apparatuses and systems can feature a single self-propelled unit operating alone, or a group of self-propelled units that operate together as part of a larger integrated system.

The following section describes one example of a self-propelled unit that supports, carries and repositions many types of objects on a support structure.

Self-Propelled Unit

FIGS. 1-5 are different views of an example of a self-propelled unit 100. Unit 100 is configured to move along two axes of movement in a two-dimensional support structure. The two axes of movement include a first axis of movement X, and a second axis of movement Y that is perpendicular to the first axis of movement. Unit 100 includes a carrier 120 configured for movable displacement on the support system. A first conveyor assembly 130 is operable to move carrier 120 on the support system along first axis of movement X. Similarly, a second conveyor assembly 140 is operable to move carrier 120 on the support system along second axis of movement Y. Each of these assemblies includes one or more conveyors.

Carrier 120 is configured to support, transport and reposition various types of objects or loads on the support structure. As noted above, object 200 can be a powered or non-powered element used in a variety of applications, including but not limited to lighting, signage, displays, HVAC, decorations, Wi-Fi, location service, anchors, disability services, audio components, store guidance, immersive entertainment lighting, UV cleaning, custodial, power distribution, stand-alone sensor packs, projectors, security/surveillance equipment, and air handling. Referring to the example of FIG. 2, object 200 is a lighting element 202 attached to a lower section of carrier 120. Lighting element 202 is schematically shown in dashed lines to indicate that the actual size, shape and orientation can vary depending on the type of light element and manner of use.

The self-propelled unit 100 also includes power contacts 160 configured to supply power to circuitry of the unit 100 (see 1010 in FIG. 6), which in turn provides controlled drive power to first conveyor assembly 130, second conveyor assembly 140 and if required, object 200. Contacts 160 are configured as retention lip contacts located in a recess 129 that extends around the perimeter of carrier 120. As will be explained, power contacts 160 are configured to engage one or more contacts provided on a support structure and maintain electrical contact with the contacts on the support structure as the unit 100 moves between locations on the support structure.

Figure 5:
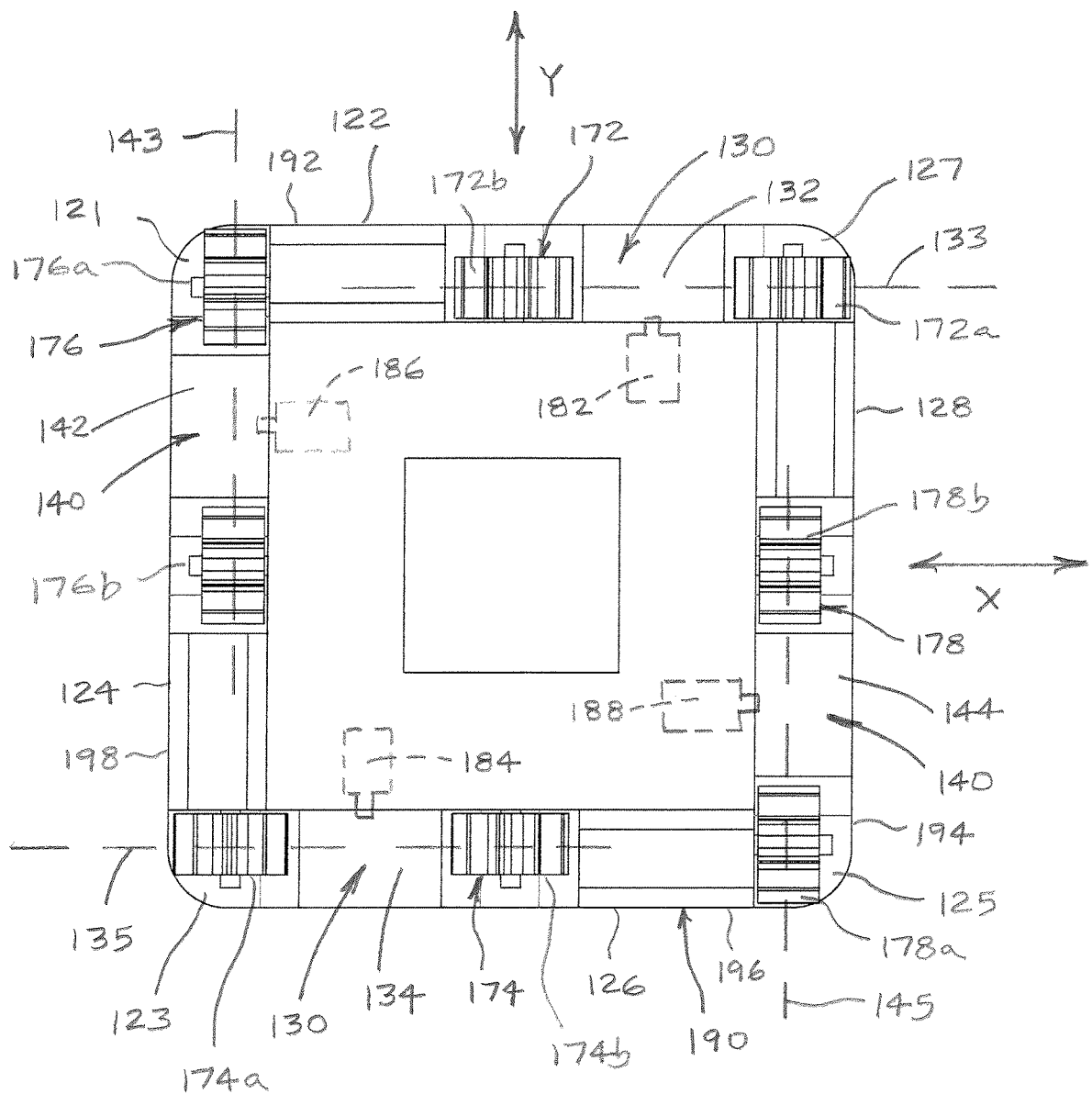
FIG. 5 is a bottom view of the self-propelled unit of FIG. 1.

Each conveyor assembly can encompass one or more conveyors. In the present example, each conveyor assembly encompasses two conveyors on opposite sides of the unit. Referring to FIG. 5, first conveyor assembly 130 includes a first conveyor 132 linearly arranged along a first conveyor path 133 and a second conveyor 134 linearly arranged along a second conveyor path 135. First conveyor path 133 and second conveyor path 135 extend parallel to one another and to first axis of movement X. Second conveyor assembly 140 includes a third conveyor 142 linearly arranged along a third conveyor path 143, and a fourth conveyor 144 linearly arranged along a fourth conveyor path 145. Third conveyor path 143 and fourth conveyor path 145 extend parallel to one another and to second axis of movement Y.

Carriers similar to 120 can have a variety of geometric configurations. In the present example, carrier 120 has a square configuration that features a first side 122, a second side 124, a third side 126 and a fourth side 128. First side 122 and second side 124 intersect at a first corner 121, and the second side 124 and third side 126 intersect at a second corner 123. Third side 126 and fourth side 128 intersect at a third corner 125, and the fourth side 128 and first side 122 intersect at a fourth corner 127. As such, first conveyor 132 partially occupies first corner 121, second conveyor 134 partially occupies third corner 125, third conveyor 142 partially occupies second corner 123, and fourth conveyor 144 partially occupies fourth corner 127.

Various types of conveyors can be utilized to allow a carrier such as 120 to move along support structures in multiple axes. For example, conveyors can feature various types of gears, wheels, and tracks driven by motors to move the carrier. In the present example, first conveyor 132 includes a first gear assembly 172, second conveyor 134 includes a second gear assembly 174, third conveyor 142 includes a third gear assembly 176, and fourth conveyor 144 include a fourth gear assembly 178. Gear assemblies can feature any number and arrangement of gears. In the example, first gear assembly 172 includes two gears 172a and 172b extending in parallel to one another. Second gear assembly 174 likewise includes two gears 174a and 174b. Third gear assembly 176 also includes two gears 176a and 176b, and fourth gear assembly 178 includes two gears 178a and 178b. Each of the gears 172a, 172b, 174a, 174b, 176a, 176b, 178a and 178b has a plurality of teeth 180 that are operable to engage a support structure having a specially configured surface, such as rack arranged along a tracked grid system. In the case of a rack, each gear works as a pinion on the rack.

Each side of the carrier extends alongside of at least one gear having a gear path parallel to first axis of movement X, and at least one gear having a gear path parallel to second axis of movement Y. More specifically, each side extends alongside of exactly one gear having a gear path parallel to one of the first and second axes of movement, and exactly two gears having a gear path parallel to the other of the first and second axes of movement. Moreover, each side extends alongside of one of the first conveyor 132 and second conveyor 134, and with one of the third conveyor 142 and fourth conveyor 144. In this arrangement each side coincides with one conveyor that moves carrier 120 along first axis of movement X and one conveyor that moves the carrier along second axis of movement Y.

In the example using linear gear teeth, conveyors configured to produce motion of the carrier in a particular direction have teeth aligned perpendicular to the direction of desired travel along the corresponding path. Each gear of such a conveyor rotates about an axis offset but otherwise generally perpendicular to the respective gear path. For example, the gears 172a, 172b have teeth aligned perpendicular to the first conveyor path 133 and rotate about respective axes offset but otherwise generally perpendicular to the first conveyor path 133. In the example, the gears 174a, 174b have teeth aligned perpendicular to the conveyor path 135 and rotate about respective axes offset but otherwise generally perpendicular to the conveyor path 135. Continuing with the example, the gears 176a, 176b have teeth aligned perpendicular to the conveyor path 143 and rotate about respective axes offset but otherwise generally perpendicular to the conveyor path 143; and the gears 178a, 178b have teeth aligned perpendicular to the conveyor path 145 and rotate about respective axes offset but otherwise generally perpendicular to the conveyor path 145.

The self-propelled unit 100 includes four on-board motors to drive the four conveyors, the motors being substantially shown in dashed lines in FIG. 5 to indicate their approximate locations inside carrier 120. The motors include a first motor 182, a second motor 184, a third motor 186 and a fourth motor 188. First motor 182 drives first conveyor 132, second motor 184 drives second conveyor 134, third motor 186 drives third conveyor 142 and fourth motor 188 drives fourth conveyor 144. As will be explained, motors 182, 184, 186 and 188 are operable to drive their respective conveyors in a coordinated manner to move unit 100 along either the first axis of movement X or second axis of movement Y.

Carriers like the example in FIGS. 1-5 can utilize a variety of motor and conveyor combinations, including but not limited to servo motors and stepper motors that drive gear assemblies. Carriers can also utilize linear magnetic motors and friction motors. In the case of friction motors, the non-driving gears can include a mechanism for lifting the non-driving gears off of the track. Although the present example is described with four motors, it is possible to use fewer motors or more motors. In one example, a single motor drive four conveyors, using two transfer cases and a transmission. In another example, two motors drive four conveyors, with a first motor driving one pair of conveyors, and a second motor driving the other pair of conveyors. For example, a carrier could feature a first motor that drives the first gear assembly 130 (i.e. drives both the first conveyor 132 and second conveyor 134), and a second motor that drives the second gear assembly 140 (i.e. drives both the third conveyor 142 and fourth conveyor 144). Alternatively, each conveyor can have one or more motors. In the case of a gear assembly featuring multiple gears, for example, each gear can be driven by a separate motor. As an alternative, carriers can be propelled by linear motors, such as a linear synchronous motors. Reference characters 182, 184, 186 and 188 are each intended to designate any kind of motor that can be used to drive gear assemblies in accordance with the present example.

During movement of carrier 120 in a given direction, the appropriate motors are operated to distribute motive power either to first conveyor assembly 130 via first conveyor 132 and second conveyor 134, or to second conveyor assembly 140 via third conveyor 142 and fourth conveyor 144. First motor 182 and second motor 184 are configured to operate in unison to activate first conveyor assembly 130 and move unit self-propelled 100 on a support structure along first axis of movement X. Similarly, third motor 186 and fourth motor 188 are configured to operate in unison to activate second conveyor assembly 140 and move unit 100 along second axis of movement Y. When first motor 182 and second motor 184 are activated, gears 172a and 172b rotate on first side 122, and gears 174a and 174b rotate on third side 126. During this time, third motor 186 and fourth motor 188 do not operate, such that gears 176a and 176b on second side 124 and gears 178a and 178b on fourth side 128 are idle. When third motor 186 and fourth motor 188 are activated, gears 176a and 176b rotate on second side 124 and gears 178a and 178b rotate on fourth side 128. During this time, first motor 182 and third motor 186 do not operate, such that gears 172a and 172b on first side 122 and gears 174a and 174b on third side 126 are idle. Self-propelled units like unit 100 can move along a support structure in predetermined incremental movements. Intelligent locomotion of a self-propelled unit can be controlled by a controller set, as explained in subsequent sections.

Figure 11:
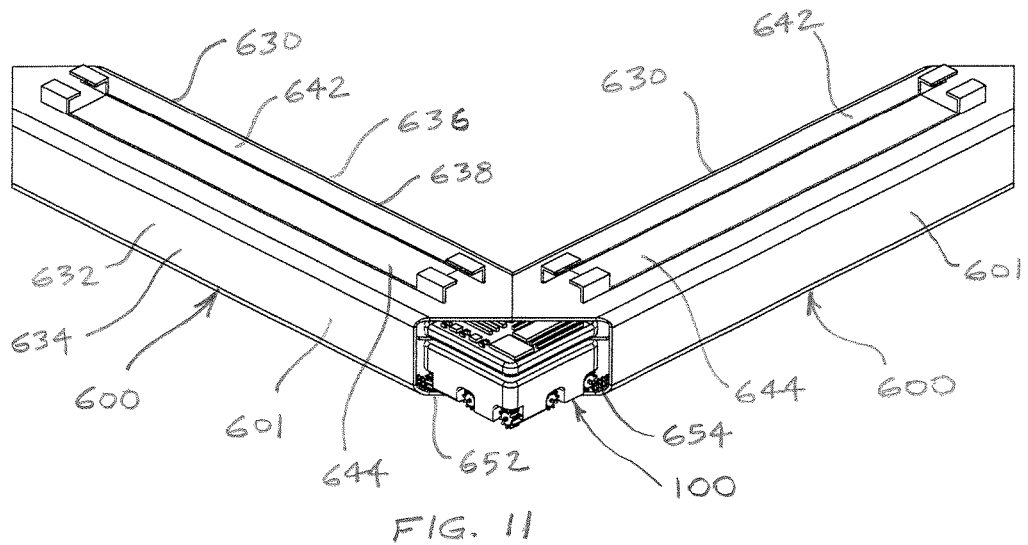
FIG. 11 is a perspective view of two components of the support structure of FIG. 9, shown with a self-propelled unit positioned at a first location in the support structure.

Self-propelled units like unit 100 can be used on different types of support structures. Some support structures may include a two-dimensional grid track featuring a longitudinal slot or gap that extends through the track, with the self-propelled unit traveling on the track above the slot. The slot can allow the unit to connect to a light element or other object through the slot, with the light element or other object being carried beneath the track, while the unit rides on top of the track. The slot for example is continuous and extends through intersections of the track to allow the light element or other object to be carried to different location. The continuous slot creates gaps and voids through the bottom of the track at every intersection. The self-propelled unit is able to traverse or cross over the gaps and voids when traversing intersections. When crossing an intersection, sections of the self-propelled unit will temporarily pass over the gap or void, at which time the sections of the self-propelled unit are suspended and no longer supported by the track. One example of this scenario is shown in FIG. 11, which will be described in more detail in a subsequent section. When sections of the self-propelled unit pass over gaps in the track, the suspended sections, however, are adequately supported by other sections of the self-propelled unit to maintain proper engagement between the unit and track.

The physical arrangement of gear assemblies 130 and 140, and their respective gears, allow self-propelled unit 100 to traverse gaps at intersections in a support structure and still remain supported on the support structure. In the scenario shown in FIG. 11, for example, three gears remain in contact with the grid track as the self-propelled unit enters a corner section of the grid track. The relative dimensions, orientations and spacings of gears 172a, 172b, 174a, 174b, 176a, 176b, 178a and 178b are selected so that appropriate gears remain engaged with the track at all times. At least one gear having a gear path in the X direction remains in contact with the track, and at least one gear having a gear path in the Y direction remains in contact with the track. In the scenario in FIG. 11, two gears having a gear path in the X direction remain in contact with the track, and one gear having a gear path in the Y direction remains in contact with the track. This ensures that self-propelled unit 100 is able to continue moving in either the X direction or Y direction upon reaching the corner section. As will be explained, self-propelled unit 100 can also be supported by flanges in the track that slidingly engage recess 129.

Carriers like 120 can have various constructions, including hollow frames or solid walled construction. Solid walled construction can be desirable to protect the motors and other sensitive components from contaminants. In the present example, carrier 120 features a solid walled housing 190. Solid walled housings can have various shapes, including but not limited to circular or polygonal shapes that partially enclose the conveyors. Housing 190 has a generally square shape having a first sidewall 192, a second sidewall 194, a third sidewall 196 and a fourth sidewall 198. Referring back to FIG. 1, first sidewall 192, second sidewall 194, third sidewall 196 and fourth sidewall 198 each define a central aperture 191 that exposes one of the gears inside carrier 120.

In addition, first sidewall 192, second sidewall 194, third sidewall 196 and fourth sidewall 198 each jointly define a corner aperture 193 with an adjacent sidewall as shown, which exposes one of the gears inside carrier 120. First conveyor assembly 130 and the second conveyor assembly 140 each project through two central apertures 191 and two corner apertures 193 and out of housing 190 in a position for engagement with the support structure.

Housing 190 includes an upper section 195 that houses a circuit board 199, and a lower section 197 that houses first conveyor assembly 130 and second conveyor assembly 140. Upper section 195 and lower section 197 can be integrally formed as a one piece body of unitary construction. As an alternative, upper section 195 and lower section 197 can be manufactured as separate parts and joined together to form the housing using riveting or thermal expansion. Lower section 197 includes a connector 151 for mounting or otherwise attaching object 200 to carrier 120. Connectors can include any type of attachment mechanism suitable for attaching an object to the lower section, including but not limited to various types of brackets, mounts, adapters, couplings, receptacles, sockets, clamps, clips, hooks, supports or other attachment mechanisms. In one example, a connector can take the form of a standard signal female port. The female port can be connected to an intermediate adapter with an integrated port for a specific load. The object can be mounted by inserting, plugging or screwing the object into the integrated port. Unit 100 in the present example is configured as a self-propelled lighting unit, and the aforementioned lighting element 202 provides illumination to an area in proximity to the carrier. Moreover, connector 151 is a socket or other type of receptacle for mounting lighting element 202 to carrier 120. Depending on the type of lighting element used and/or the mode of operation of the lighting element, light can be widely dispersed around unit 100, or concentrated to a specific area directly beneath the unit.

Control System

Figure 6:
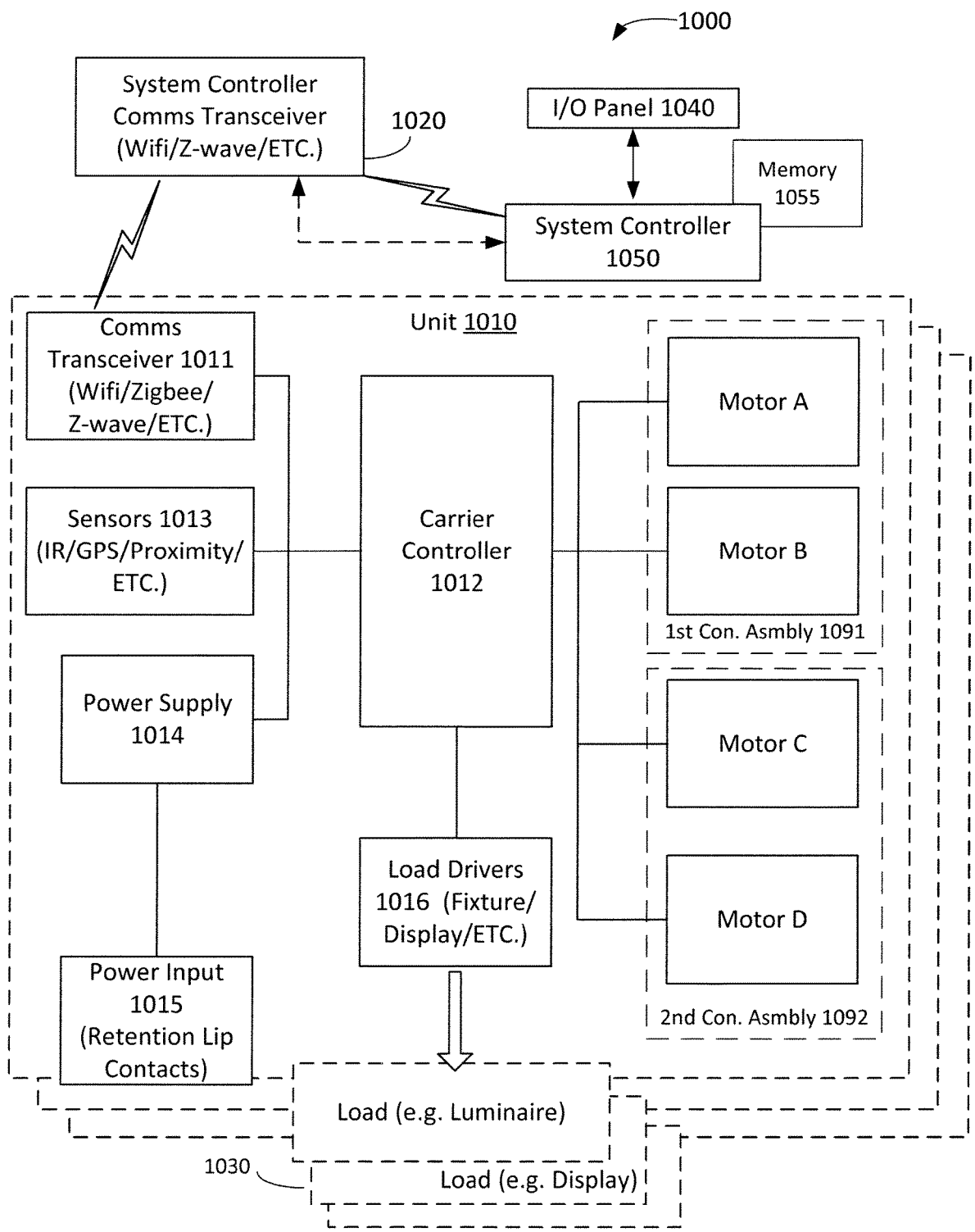
FIG. 6 is a functional block diagram of a control system and self-propelled unit.

FIG. 6 illustrates a functional block diagram of a control system 1000 for controlling operation of at least one self-propelled unit 1010, which may be a unit like 100 described in the previous sections. System 1000 includes one or more units 1010, a communications transceiver 1020, a load 1030, a system controller 1050, a memory 1055 and an input/output (I/O) panel 1040. Operation of system 1000 is managed by system controller 1050. The system controller 1050, along with the memory and possibly the I/O panel and/or the transceiver, may be configured as a dedicated wall unit, or the system controller 1050 and associated elements may take the form of a more generic computer-like device, e.g. a user terminal computer, a server, a mobile device or the like. Although not shown in detail, such a system controller 1050 may include a central processing unit (CPU), in the form of circuitry forming one or more processors, for executing program instructions. System controller hardware typically includes an internal communication bus, program and/or data storage for various programs and data files to be processed and/or communicated by the system controller. The hardware elements, operating systems and programming languages of such a system controller are conventional in nature, and it is presumed that those skilled in the art are adequately familiar therewith.

System controller 1050 is coupled to memory 1055 and I/O panel 1040. System controller 1050 is configured, upon execution of program instructions stored in memory 1055, to control the movement and operation of each unit 1010 in response to an input received from the I/O panel 1040.

System controller 1050 may communicate wirelessly with unit 1010 via system controller communications transceiver 1020. Alternatively, system controller 1050 may be coupled via a wired connection to system controller communications transceiver 1020.

The I/O panel 1040 is a user interface device that may include a touchscreen display for presentation of a graphical user interface and other information, buttons or switches that are actuated by a user, a computer pointing device, such as a mouse, touchpad, trackball, or the like. The I/O panel 1040 may be collocated with system controller 1050 or may be located remotely. In addition, the I/O panel 1040 may also be coupled wirelessly via, for example, Bluetooth or Wi-Fi to system controller 1050. Moreover, it is possible for the I/O panel 1040 to be coupled with a hardline wired connection. As explained in more detail below with reference to FIGS. 7 and 8, system controller 1050 responds to inputs from the I/O panel 1040.

Memory 1055, in addition to storing the programming instructions for system controller 1050, may also store information (such as operational information and configuration information) about each unit 1010 in system 1000, information for presentation on the I/O panel 1040, or the like.

System controller communications transceiver 1020 may be configured to exchange communications between one or more of the units 1010 and the system controller 1050. Assuming wireless communication, by way of example, the system controller communications transceiver 1020 may be configured to communicate according to one or more communication protocols, such as Wi-Fi, Zigbee, Z-wave, Bluetooth, X10 or the like. In another example, unit 1010 could use a wired link (power line) for data communication. Given that the retention lips have contact points for power source and that there is a power source that feeds to the infrastructure (support structure), data transmission could occur over the power line as an alternative to or in conjunction with wireless communication. Other options include comm over power, and inductive power and Li-Fi.

Unit 1010 includes a communication transceiver 1011, a carrier controller 1012, sensor(s) 1013, a power supply 1014, power input 1015, load drivers 1016 and motors A-D. While only one unit 1010 is shown in detail, system 1000 may include multiple units that are configured identically or differently. For ease of discussion, only unit 1010 will be described in detail.

Although purpose built logic circuitry can be used, carrier controller 1012 is typically implemented by a programmable device such as a microprocessor or a microcontroller, configured to execute programs and process data that controls operation of unit 1010. A microcontroller is typically a 'system on a chip' that includes a central processing unit (CPU) and internal storage; therefore, a microcontroller implementation might incorporate carrier controller 1012, and a memory within the microcontroller chip.

In the present example, unit 1010 utilizes wireless links to communicate with system controller 1050. Communications transceiver 1011 is a radio frequency (RF) wireless transceiver that is coupled to carrier controller 1012. Assuming a wireless implementation of the communications, the communication transceiver 1011 may conform to any appropriate RF wireless data communication standard such as wireless Ethernet (commonly referred to as Wi-Fi), Z-wave, X10, Bluetooth Zigbee or the like. At a still relatively high level, communications transceiver 1011 may include RF communication circuitry coupled to carrier controller 1012. The wireless protocol and applicable power levels, however, would typically be compatible with those used by system controller communications transceiver 1020, to facilitate wireless communications between the transceivers 1011 and 1020.

Sensors 1013 may include one or more sensors for detecting intersections of a support structure in which unit 1010 travels. Sensors may include infrared (IR) sensors, global positioning system (GPS) sensors, ultrasonic sensors, video sensors, image sensors, optical sensors, magnetic field sensors, voltage sensors, radio frequency sensors, light intensity sensors, or the like. The sensors 1013 may be connected to carrier controller 1012 to facilitate collection, analysis, and communication of sensor data and/or data derived from the sensor data. For example, sensors 1013 may provide an indication that unit 1010 has reached an intersection within the support structure.

Power supply 1014 converts power from power input 1015 to one or more appropriate forms/levels required by the various electronic components of unit 1010 and distributes the converted power to those electronic components. Power input 1015 may receive power from the support structure that carries unit 1010, which may be a track system or other type of support structure as described in previous sections herein. For example, power input 1015 may receive electrical power via retention lip contacts, such as contacts 160 described previously, that are in contact with electrical contacts within the support structure, such as first and second electrical contacts 662 and 664 in track modules 600 (described later). In this arrangement, the retention lip contacts receive power supplied via the support structure. The power may also be supplied via an induction power supply system within channels of the support structure. Alternatively, power may be supplied via conductive lubricant to provide power through the gears.

Unit 1010 may be configured to provide different functions for a particular space, such as a multi-purpose space. For example, in a system that deploys multiple units (such as the system that will be described in connection with FIGS. 7 and 8), some of the units in the system may be configured with loads 1030 that enable the units to function as lighting devices, while other units in the system may be configured with loads that enable the units to function as display devices, wireless network access points, space environment sensors (e.g. smoke alarms, carbon monoxide alarms or the like) or other devices. A unit, such as unit 1010, may have one or more loads connected to it, and the carrier controllers 1012 may be configured to output control signals according to the one or more connected loads 1030.

Carrier controller 1012 also provides control signals to load drivers 1016. The respective units 1010 may be configured as lighting devices, display devices, sensor devices, wireless network access points or the like. Each carrier controller 1012 may be configured to provide driver control signals depending upon the type of load to the load drivers 1016. For example, if the connected load is a light source, carrier controller 1012 may supply driver control signals suitable for driving the light source to output light according to a selected configuration. The selected configurations will be described in more detail with reference to FIG. 7.

Carrier controller 1012 is also coupled to a first conveyor assembly 1091 that includes motor A and motor B, and to a second conveyor assembly 1092 that includes motor C and motor D. Carrier controller 1012 provides drive signals to the respective conveyor assemblies 1091, 1092 based on an assigned travel order received from system controller 1050. Motors A-D of the respective first and second conveyor assemblies 1091 and 1092 may also provide feedback regarding the number of rotations and/or other operation information that may be used in distanced traveled and/or location estimations, as well as feedback regarding blockages, or broken gear teeth. Location services (e.g. GPS, UWB, Etc.) verify that the travel order resulted in the correct location and output. Motors A-D may be servo motors, stepper motors or other electric motors having the appropriate feedback signals.

Operational processes of system 1000 will now be described with specific reference to FIGS. 7 and 8.

Figure 7:
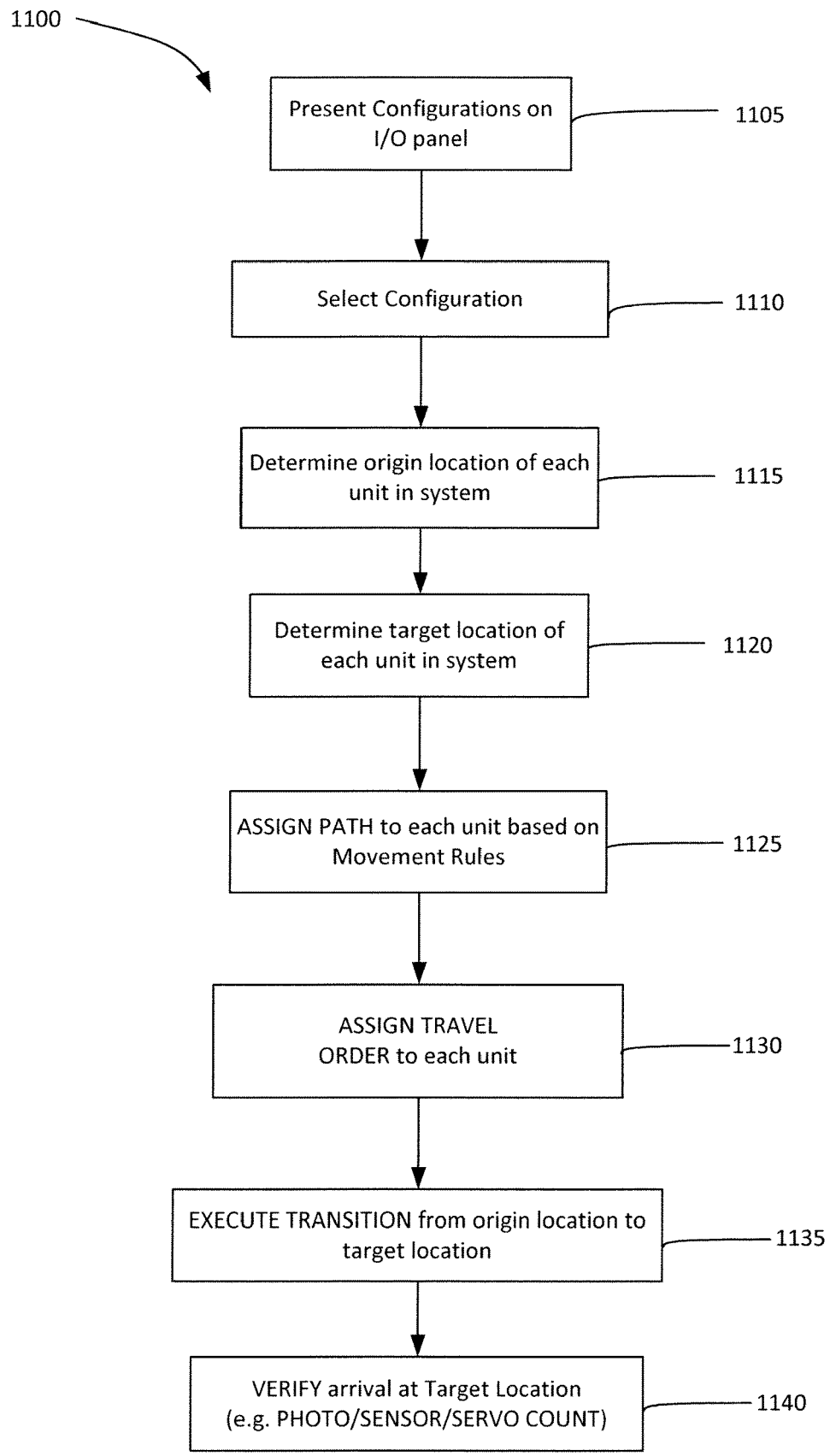
FIG. 7 is a high-level flow diagram of a control process.

FIG. 7 illustrates an example of a control process 1100 for a system that utilizes self-propelled units, such as the self-propelled units described with reference to the earlier Figures. Control process 1100 is implemented through the I/O panel, such as I/O panel 1040, which is coupled to system controller 1050. In step 1105, a user selects a system configuration encompassing a number of self-propelled units via a graphical user interface, such as a touchscreen display, toggle switches, pushbuttons or the like, coupled the I/O panel 1040. For example, in response to the user inputs, the I/O panel 1040 may present to the user a number of system configuration options at step 1110 from which to choose. The presented system configuration options may be predefined configurations that were previously set up by the user, preset by the system, or by another user of the system. For example, if the system is implemented in a multi-purpose space, each of the predefined configurations may be set up by the users of the space to have each of the units in the system at a preset location in the support structure depending upon the use of the space. In some instances, the predefined system configuration may arrange the self-propelled units for use as a night club, a restaurant, an office space, a school, a retail establishment or the like. Each of these different uses may have defined preset locations for the self-propelled units in the system. Memory 1055 may store the preset locations of the respective self-propelled units as part of a predefined configuration corresponding to a particular usage intended from the multi-purpose space. Selections from among existing configurations may be responsive to manual input or automatic criteria, such as day and/or time. Some uses may require operation of all of the self-propelled units, while other uses may not. In such instances, there are number of ways to manage the use or allocation of self-propelled units. For example, the system can utilize a magazine-style hopper located inside a wall, or above a ceiling. Units that are needed for a particular use are released from the hopper, and units on the track that are not needed are returned to the hopper. Alternatively, unused units on the track system can migrate to a remote location on the track system, for example at a side location or far corner above a room, where the unused units are parked in a hibernation mode.

The preset locations in the predefined configuration may be determined based on the set-up and/or functional capabilities of each self-propelled unit in the system as selected or most applicable to an intended usage of the space. As described with reference to FIG. 6, each unit may be constructed or set-up as a lighting device, a sensor, a wireless network access point (e.g., Wi-Fi, Bluetooth or the like), a display or some other specific arrangement. The predefined configurations are built taking into account these specific unit arrangements. The predefined configurations also include predefined settings for each load of a self-propelled unit. For example, when a multi-purpose space is used as a retail store, the settings for the respective load driver, such as load driver 1016, may be different from the settings used when the multi-purpose space is utilized as a night club. Specifically, the control signals applied to the load driver for a light in the retail store example may be different than the control signals applied to the load driver for the same light in the night club example. The predefined configuration may also include settings for control signals that are to be applied to the respective load drivers, such as load driver 1016. Alternatively, the carrier controller 1012 may be configured with a memory that stores the load driver settings for each predefined configuration. In other examples, the carrier controller sends appropriate control signals over a universal communication interface such as usb-c. The load driver then is either built into the load itself or into an intermediate adapter between the connector and the load.

Once the system configuration is selected at step 1110, the origin location of each self-propelled unit in the system is determined at step 1115. System controller 1050 may directly inquire with each self-propelled unit in the system via a communications transceiver, such as communications transceiver 1020, as to the origin location of the respective self-propelled unit in the support structure. The origin location determination may be made in a variety of ways. For example, each respective self-propelled unit may respond via a communication transceiver 1011 with a detector output indicating that unit's location within the support structure, a count of the number of turns of a gear of one of the conveyor assemblies, the rotations of a servo motor of one of the conveyor assemblies, retrieving it from a memory, or the like. Alternatively or in addition, if a sensor has picked up an identifiable marking from the track, e.g. a barcode or RF ID at the last intersection the self-propelled unit crossed, that information may be sent to the system controller 1050 for use in the location determination for the particular self-propelled unit. Upon determining the origin location of each self-propelled unit in the system at step 1115, the process 1100 proceeds to step 1120. At step 1120, the target location for each unit in the system is determined based on the predefined configuration selected at step 1110.

Each self-propelled unit in the group of units will have its own assigned path from the respective self-propelled unit's origin location to the target location for that particular unit. The system controller may determine the assigned path using a number of different movement rules. The movement rules dictate the movement of each respective self-propelled unit from its respective origin location along the support structure (shown in the other examples) to the respective unit's target location. The movement rules may, for example, establish right of ways for each respective self-propelled unit at intersections in the support structure. For example, the northernmost self-propelled unit may have the right-of-way when approaching an intersection, followed by easternmost self-propelled unit, followed by southernmost self-propelled, and lastly, the westernmost unit. Alternatively, the right-of-way may be determined as being clockwise or counter-clockwise. Similar rules may also be established to avoid collisions between self-propelled units as the respective units travel to their target locations. For example, an algorithm such as last in, first out (LI-FO) may be implemented to avoid collisions. There may also be a rule for maintenance routing the objective of which is to have all of the units travel approximately the same distances (over their lifetimes) so as to ensure adequate lubrication of the support structure and the gears of the respective self-propelled units.

Once the system controller determines the assigned path for each self-propelled unit of the system, the system controller generates an individualized travel order for assignment to each respective self-propelled unit, and transmits the assigned travel order via the system controller communication transceiver, at step 1130, to each of the respective self-propelled units. The travel order may contain travel information such as directions to the target location, right-of-way information, and other travel information. The travel order may optionally include load driving information. When a self-propelled unit receives its assigned travel order, the unit executes a transition, at step 1135, from the origin location to the target location. The movements of the respective self-propelled units are based on information contained in the travel orders. Upon completion of the assigned travel order, each respective self-propelled unit verifies its arrival at the target location by providing an image, a sensor output, a gear count a servo count, or the like (1140). For example, an image may be collected by a camera on the respective self-propelled unit and transmitted to the system controller or the I/O panel. Alternatively, when the unit completes the assigned travel order, the carrier controller may transmit via a carrier communication transceiver a servo rotation count to the system controller. In addition, a location code or magnetic strip along the support structure may be used to also indicate the position of the unit. Radio Frequency-based location services based on Bluetooth or Global Positioning System (GPS) may also be used to determine the location of the respective units. As an alternative, locating means can include Ultra Wide Band (UWB) location technology. The respective self-propelled units may transmit their positions to the system controller for future reference.

Systems can include distributive processing that allows each carrier to know the relative position or location of all of the other carriers. This capability can allow a single carrier to think or act on behalf of the group, circumventing a central processor.

Figure 8:
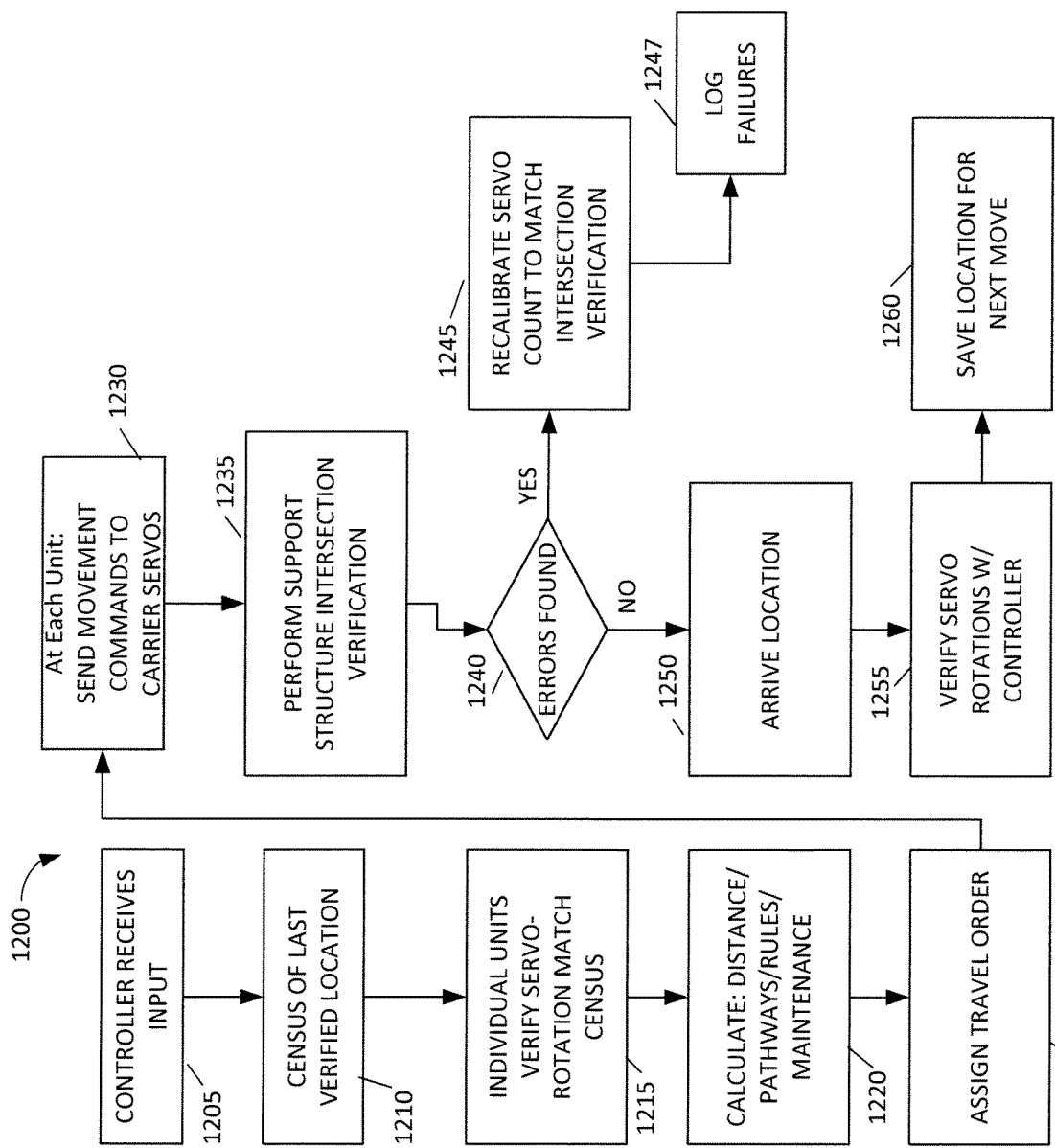
FIG. 8 is a flow diagram of a more detailed example of a control process.

FIG. 8 is a flowchart of an example process 1200 by which a self-propelled unit is instructed to perform a movement. Process 1200 is performed by system controller 1020 of FIG. 6 to enable a unit 1010 to move within a support structure.

At step 1205, system controller 1020 receives an input selecting a predefined configuration. The input may be received from a user via the I/O panel or via another user interface.

In response to the user selection, the system controller executes a "census" operation, at step 1210, to determine the last verified location of each of the self-propelled units in the system. The census operation may be an inquiry operation performed by the system controller to confirm or verify the location of each self-propelled unit in the system. For example, the system controller may access a data structure stored in a memory, such as memory 1055, to retrieve a last known or expected location of the respective self-propelled units as reported by the respective units after completion of a travel order. Alternatively, the system controller may transmit an inquiry to each self-propelled unit in the system requesting a response including the respective unit's location from each respective unit.

In response to results of the census, the system controller, at step 1215, may transmit a request addressed to each self-propelled unit requesting the latest servo rotation count, sensor output, or other information that enables the system controller to verify that the location stored in the data structure is the same location as reported by the respective self-propelled unit. Any discrepancies between the location stored in the data structure and the location reported by the self-propelled unit is resolved based on unit's reported location. Once the location of each self-propelled unit is verified at step 1215, the system controller may begin calculating at step 1220 the travel order indicating the route each respective self-propelled unit will be assigned to arrive at the target location to meet the selected predefined configuration. The system controller calculates various parameters for each respective self-propelled unit, such as distance to be traveled by each respective unit, available pathways for travel from an origin location to a target location, collision avoidance and ease of travel rules (e.g., right-of-way rules at intersections or last-in-first-out rules of travel), and maintenance rules.

Maintenance rules are rules that insure that the support structure remains lubricated and that each unit travels approximately the same distance over the same time period. For example, the self-propelled units lubricate the support structure as they move through the support structure, so if a portion of the support structure has not been traveled through recently (e.g., within the past week or the like) by a self-propelled unit, the system controller may assign a travel order to a respective self-propelled unit to travel through the particular portion of the support structure to refresh the lubricant in that portion of the support structure. Another maintenance rule may be for all self-propelled units to travel approximately the same distance over a unit lifespan so that the self-propelled units in the system all incur the same amount of wear over a given time period. It is beneficial if the amount of wear is kept approximately equal on all the self-propelled units so that any repairs may be performed on all the units at the same time, instead of on a unit-by-unit basis at different times.

Once system controller 1020 has calculated the pathway distances and accounted for the collision avoidance and ease of travel and maintenance rules for the respective units in step 1220, the system controller generates a travel order for each respective self-propelled unit at 1225, and assigns the respective travel orders to the respective units for execution. As part of the assignment at 1225, the system controller sends, for example, via a communications transceiver, the respective travel orders in a message addressed to the respective unit to which the travel order has been assigned.

The respective self-propelled units receive their assigned travel orders, and begin executing the travel orders. At step 1230, the respective processor of each respective self-propelled unit outputs movement commands to the respective unit servos (i.e., electric motors) according to the assigned travel order. As the self-propelled units move about the support structure on their way to their respective target locations, each respective self-propelled unit may likely encounter an intersection in the support structure.

Upon encountering a support structure intersection, the respective self-propelled unit performs a support structure intersection verification at step 1235. The support structure intersection verification is a process performed by the carrier controller of each respective unit. The respective carrier controller 1012 obtains an identifier associated with the support structure intersection and compares that to an intersection identifier in the assigned travel order. For example, each self-propelled unit may include sensors, such as an infrared (IR) detector, a radio frequency identifier (RF) detector, an electrical contact point, a magnetic contact point or the like, to detect some indicator associated with each intersection that uniquely identifies each intersection in the support structure to the respective self-propelled unit.

If an IR detector is used, for example, a respective intersection in the support structure may have a unique IR reflector or code that uniquely identifies the intersection to the unit's processor in controller 1012. In another example, each respective self-propelled unit may have a magnetic sensor, and each respective intersection of the support structure may be marked with unique magnetic patterns, magnetic field strengths, or combinations thereof that uniquely identify—the respective intersection from other intersections in the support structure. In yet another example, the self-propelled unit may have an electric contact that makes physical contact with electrical contacts in the vicinity of a support structure intersection. In response to making electrical contact between the unit's electrical contact and the electrical contacts in the vicinity of the intersection, the carrier controller may detect a voltage or series of voltages (in the case of multiple contacts) that uniquely identify the respective intersection.

In a specific example of the support structure intersection verification process at step 1235, the carrier controller determines the number of rotations of a servo motor made until the self-propelled unit reached an intersection. Upon detecting an intersection by the respective unit's sensor or detector, the carrier controller compares the intersection identifier obtained by the carrier sensor or detector to the intersection identifier provided in the travel order. If the intersection is correct, the carrier controller may compare the number of rotations that the servo motor actually traveled to reach the intersection to the number of rotations in the travel order that the respective self-propelled unit was supposed to travel until reaching the intersection. Note that the number of rotations may also refer to fractional parts of a rotation. At step 1240, the carrier controller determines if there was an error in the number of rotations. If the determination is YES, there was an error, for example, in the number of servo rotations, the process 100 proceeds to step 1245. At step 1245, the carrier controller recalibrates the servo count in the assigned travel order to match the actual number of servo rotations. Similarly, if the wrong intersection is found, the carrier controller may update the travel order. These errors may be logged in a failure data structure for later transmission to the system controller by each respective carrier controller. The system controller analyzes the errors logged in the failure data structure and uses the results of the analysis as part of a learning algorithm that adjusts calculation parameters or the like that are used in step 1220. For example, if the number of errors occurring at a particular intersection in the support structure exceeds a maximum threshold, the system controller may indicate, for example, on the I/O panel that maintenance at the particular intersection location is required or the like.

However, if at step 1240, NO errors are found, process 1200 proceeds to step 1250. At step 1250, the respective self-propelled unit arrives at the target location, and the carrier controller of each respective unit notifies the system controller that the respective unit has arrived at the target location in the assigned travel order. In addition, each respective self-propelled unit may notify the system controller of the number of servo rotations performed and/or identifications of intersections crossed to arrive at the target location. After verifying the servo rotations and/or intersection identifications with the system controller at step 1255, process 1200 proceeds to step 1260.

The carrier controller saves the target location for use as the origin location when a next movement is needed. The carrier controller also transmits the target location to the system controller for future verification or census taking.

System 1000 may also incorporate diagnostics modes. For example, if a particular unit has repeated errors at a specific intersection, a different unit may be instructed to traverse the intersection to see if the error is repeated. This may be used to diagnose whether the problem is with the particular unit or the particular intersection.

As noted above, self-propelled units can be configured to support, transport and reposition various types of objects or loads on a support structure. Support structures can be configured in various arrangements, and with various types of support elements. The following section describes a support structure, on which a self-propelled unit such as self-propelled unit 100 or 1010 can support, carry and reposition different types of objects.

Support Structure

Figure 9:
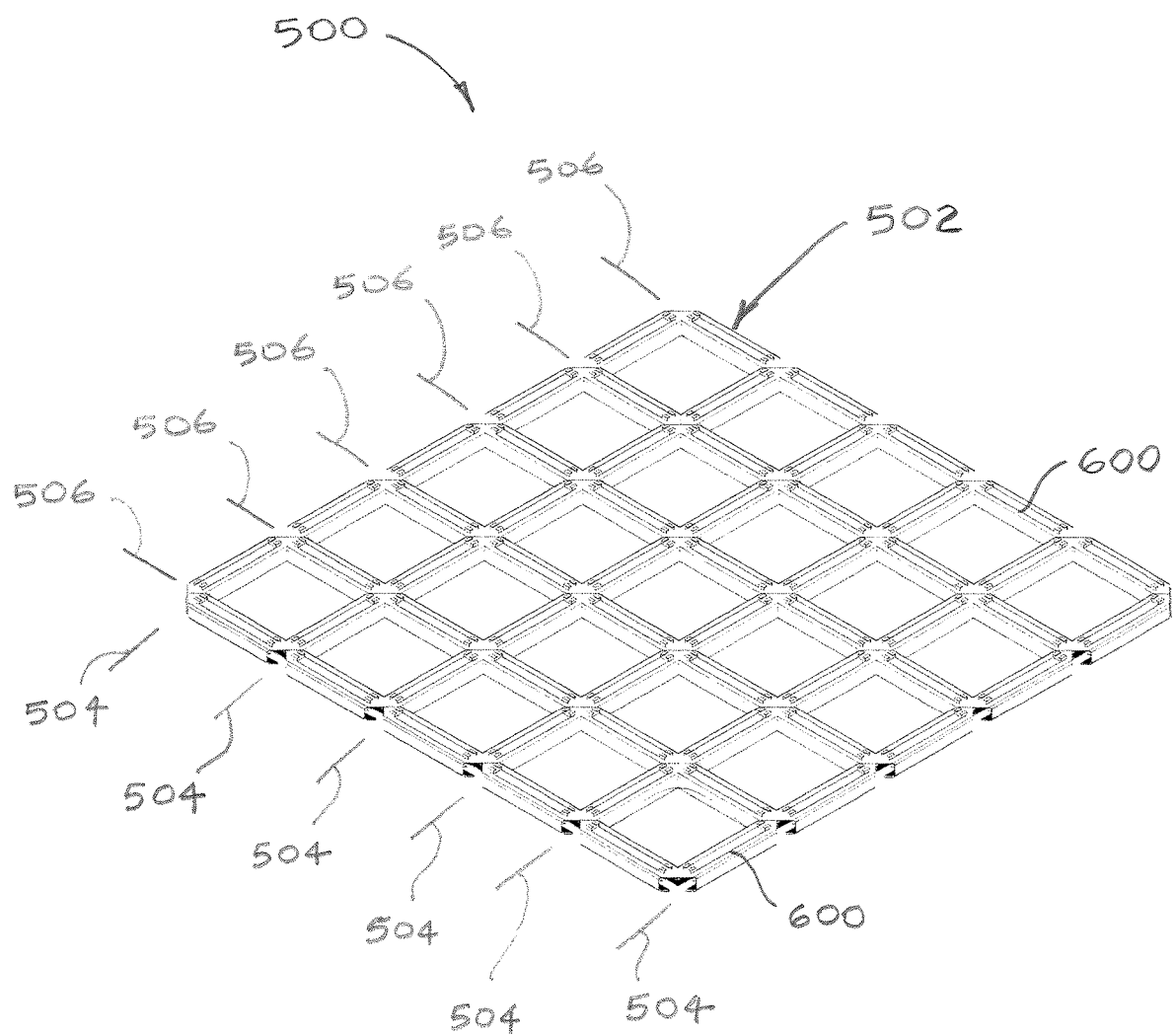
FIG. 9 is a perspective view of a grid type support structure.

FIG. 9 shows a support structure in accordance in the form of a modular track system 500. Track system 500 is made up of several track sections or "track modules" 600 connected end-to-end in a square shaped grid 502. Grid 502 is made up of six evenly-spaced rows 504 and six evenly-spaced columns 506. In this arrangement, track system 500 provides two axes of intelligent locomotion for a self-propelled unit on the track system. In particular, track system 500 provides for movement of one or more self-propelled units and objects supported on such units along a first axis of movement X, parallel to the direction of each row 504, and for movement of one or more self-propelled units along a second axis of movement Y, parallel to the direction of each column 506.

Figure 10:
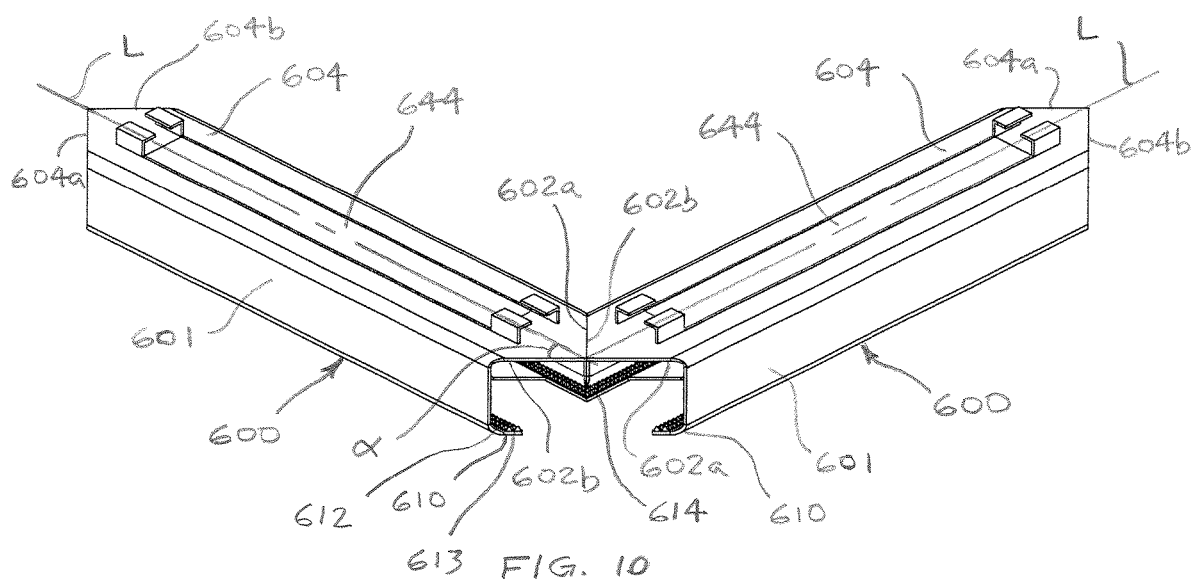
FIG. 10 is a perspective view of two components of the support structure of FIG. 9.

Referring to FIG. 10, two track modules 600 of track system 500 are shown in more detail. Each track module 600 has an elongated body 601 that defines a longitudinal axis "L". Each elongated body 601 has a first end 604 and a second end 606 having a configuration that is identical to the configuration of the first end. Track modules can be configured to join together end-to-end with a miter joint. For example, track modules can have at least one beveled edge on each end that allows that end to join with a mating end of another track module in a miter joint. In the example with one bevel on each end of each module, the one beveled edge on one module joins with an opposing beveled edge on a complementary end of another track module. In the example with two bevels on each end of each module, one beveled edge on one module joins with an opposing beveled edge on an identically-configured end of another track module. In the present example, end 602 has a first beveled edge 602a and a second beveled edge 602b, and end 604 has a first beveled edge 604a and a second beveled edge 604b. First beveled edge 602a and second beveled edge 602b are arranged symmetrically relative to longitudinal axis L. Likewise, first beveled edge 604a and second beveled edge 604b are arranged symmetrically relative to longitudinal axis L.

Beveled edge 602a of track module 600 on the left side of the Figure is joined to beveled edge 602b of track module 600 on the right side of the Figure. Each beveled edge 602a, 602b, 604a and 604b on track module 600 is oriented at an angle α of 45 degrees relative to longitudinal axis L of the track module. In this arrangement, track modules 600 are joined end-to-end in a miter joint, in which the two track modules are connected at 90 degrees.

Figure 18:
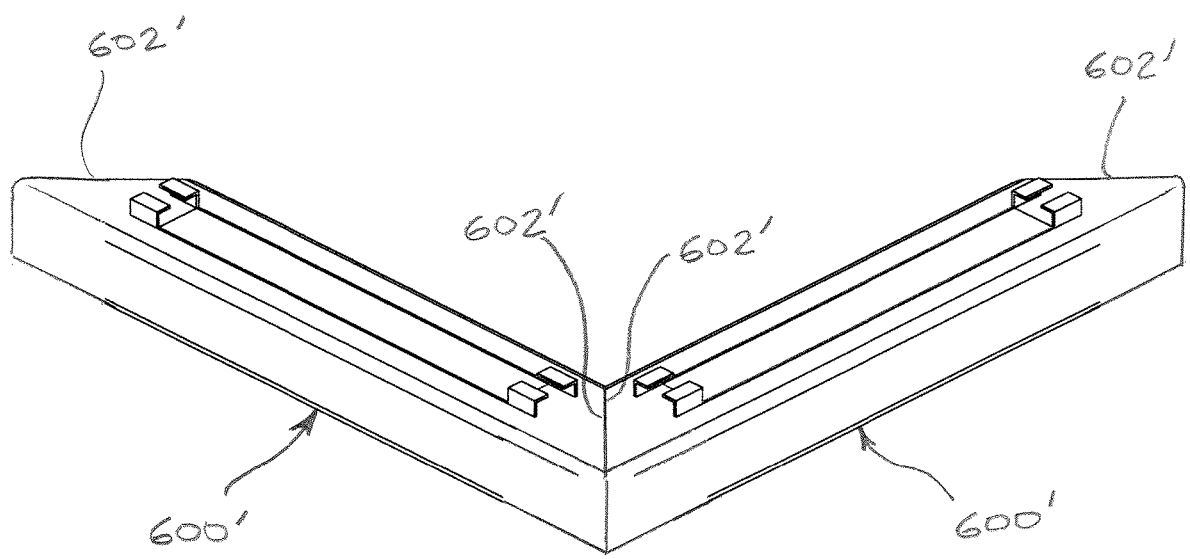
FIG. 18 is a perspective view of two components of an alternate example of a support structure.

It will be appreciated that track modules need not have symmetrical beveled edges in order to facilitate end-to-end connections. In addition, it will be appreciated that different types of beveled arrangements can be used to accomplish end-to-end miter connections, and that the symmetrical beveled edges shown thus far are not the only configurations that will facilitate miter connections. For example, FIG. 18 shows two track modules 600' in accordance with another example, where each track module has a single beveled edge 602' on each end. The single beveled edge 602' allows multiple track modules 600' to be joined end-to-end in a miter connection. This design allows multiple track modules to be assembled into a regular or irregular arrangement, similar to track module 600. However, the single beveled edge 602' is only capable of joining to one other track module 600' at a time, which limits its usage to simpler track geometries.

Figure 12:
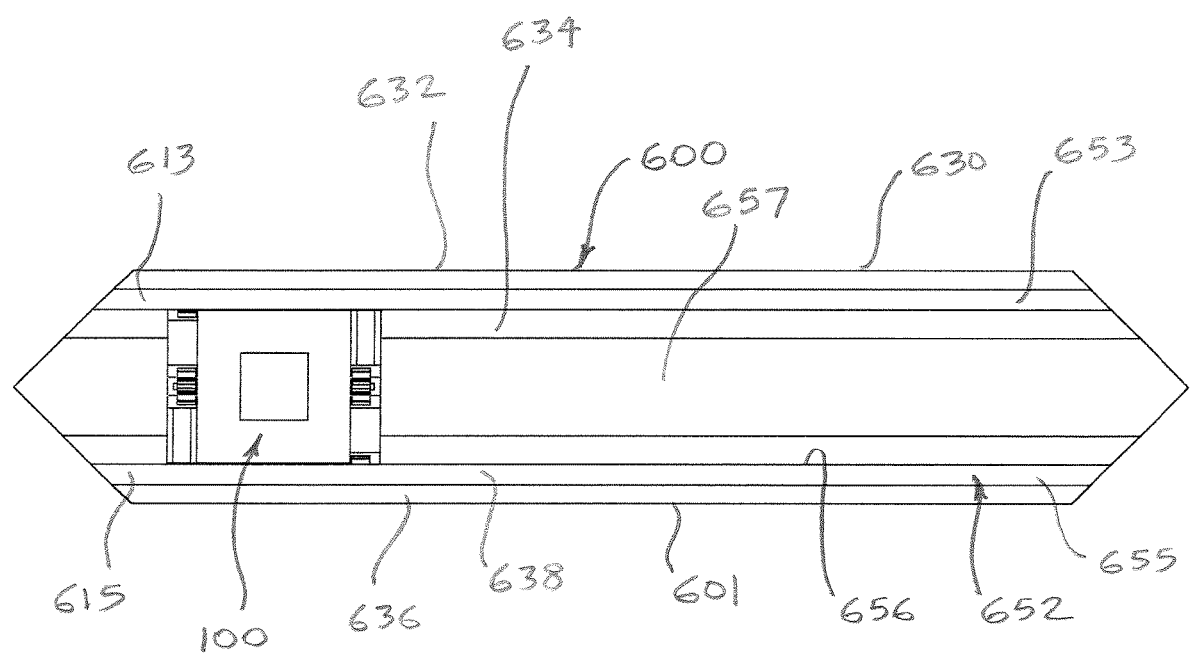
FIG. 12 is a bottom view of a component of the support structure of FIG. 9, shown with a self-propelled unit positioned at a second location in the support structure.

Support elements can include various means for conveying self-propelled units on the support structure, including various track configurations. Track configurations can be configured to cooperate with conveyor assemblies of self-propelled units, including but not limited to gear assemblies. Referring to the example in FIG. 10, each track module 600 has a track surface 610 that extends longitudinally along elongated body 601. Track surface 610 includes a plurality of raised protuberances 612 that are arranged in rows that are parallel to longitudinal axis L, and arranged in columns that are perpendicular to longitudinal axis L. Each protuberance 612 is in the form of a tooth or projection 614 that is configured to mesh with one or more gears of a self-propelled unit, such as the gears on unit 100. FIGS. 11 and 12 show unit 100 as it would appear when being operated on track modules 600.

Figure 13:
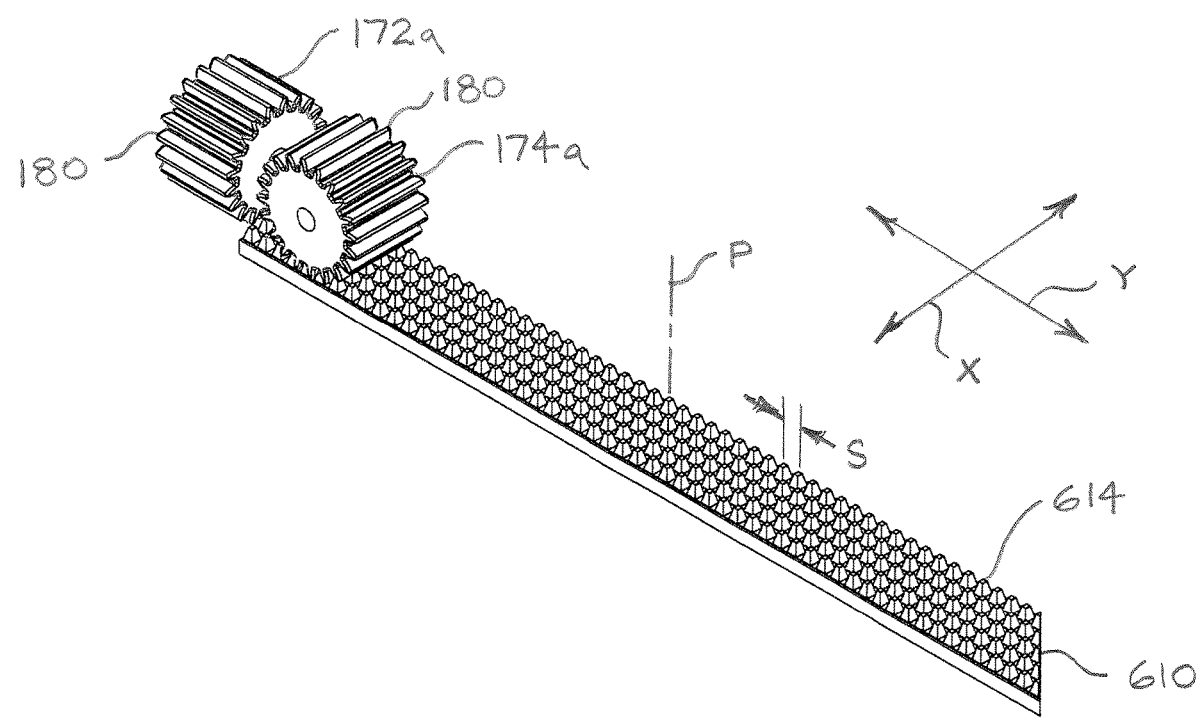
FIG. 13 is a truncated perspective view illustrating details of components of a self-propelled unit and a section of a support structure.
Figure 14:
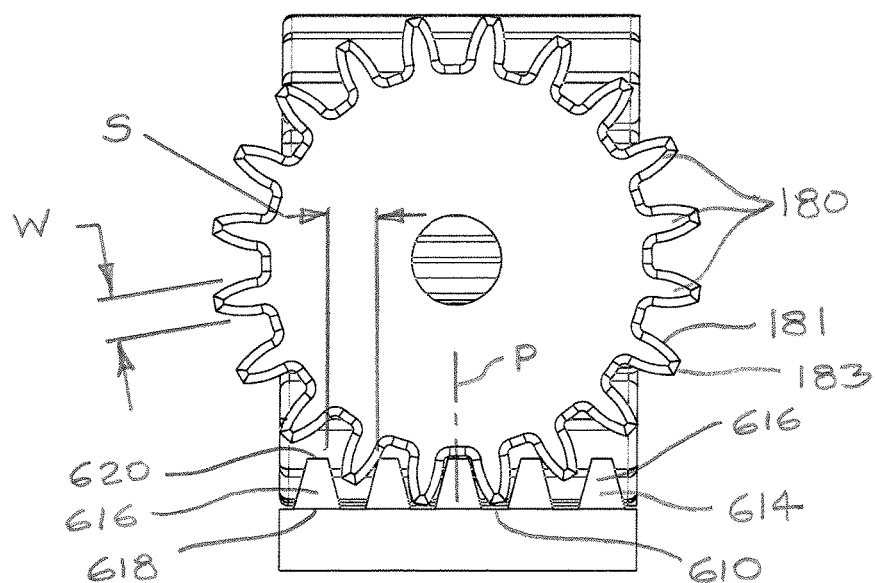
FIG. 14 is an enlarged elevation view of components of a self-propelled unit in and a section of a support structure.

FIGS. 13 and 14 schematically illustrate how orthogonally arranged gears, such as gear 172a and gear 174a on unit 100, cooperate with projections 614 on track surface 610. Track surface 610 is configured to cooperate with each gear assembly on unit 100, regardless of the direction of the gear path. Each gear cooperates with track surface 610 in an "active mode", in which the gear rolls along the track surface, and in a "passive mode", in which the gear remains idle. When unit 100 moves in a direction parallel to a gear's gear path, the gear is in its "active mode", in which the gear is driven by its motor, and the teeth 180 of the gear interdigitate with projections 614. This allows the gear when driven by the associated motor to propel unit 100 along the track in the direction of its gear path. When self-propelled unit 100 moves in a direction perpendicular to the gear's gear path, the gear is switched to a passive mode. In the passive mode, no power is delivered to the gear, and the gear remains idle. The teeth 180 of the gear pass between projections 614, as shown in FIG. 14, which allows unit 100 to move perpendicularly to the gear's gear path without interference from that gear.

Each projection 614 has a projection axis P that extends normal to track surface 610. Moreover, each projection 614 is symmetrical with respect to axis P. Projections 614 are spaced uniformly along first axis of movement X and along second axis of movement Y. That is, each projection 614 is separated from an adjacent projection 614 along first axis of movement X by a spacing S, and separated from an adjacent projection 614 along second axis of movement Y by the same spacing S, so that the spacing between projections is constant in both directions. This allows two track surfaces 610 to be joined in a miter connection at a 90 degree intersection while maintaining a uniform pattern of projections without any discontinuity or interruption in the pattern. The uniform pattern of projections between adjacent track sections at intersections allows gears to travel biaxially on the track in a seamless manner from one track module to another track module.

Spacing S is slightly wider than a maximum width W of each gear tooth 180 on unit 100. This creates clearance that allows gear teeth 180 on each gear to interdigitate with projections 614 when the gear is in active mode, and to pass between projections 614 when that gear is in passive mode.

Projections can have various geometric shapes and profiles that permit two-dimensional engagement with gear wheels, including but not limited to frustoconical shapes, such as conical frustums and square frustums. In the present example, track surface 610 is in the form of a "pyramid rack". The term "pyramid rack" as used herein means that the projections 614 on the track surface are in the form of square frustums, each frustum having four trapezoidal shaped sides 616 that extend from a wide square base 618 and converge toward a smaller flat top face 620. In contrast, each tooth 180 on the gear has rounded sides 181 that converge from a wider base toward a flat end face 183. The tapered rounded configuration of each tooth 180 allows the tooth to pass smoothly between projections 614 when the gear is in passive mode. As teeth 180 pass between projections 614 in the passive mode, the projections act as guides for the teeth.

Depending on how the self-propelled units and track modules are configured, track modules can convey self-propelled units in a number of arrangements. For example, the self-propelled unit can be conveyed on top of a track module, beneath a track module, or inside a track module. Referring to FIGS. 11 and 12, elongated body 601 of track module 600 is a hollow conduit 630 that allows one or more self-propelled units to travel inside track system 500. Conduit 630 has a first side wall 632 defining a first side 634 and a second side wall 636 defining a second side 638. Conduit 630 also has a top wall 642 that extends between first side wall 632 and second side wall 636.

Self-propelled units and track modules can be installed in new installations in ceiling structures. For example, self-propelled units and track modules can be installed above ceiling tiles that are mounted to ceilings at their center portions, leaving spaces between the tiles where the objects carried by the self-propelled units can travel. As an alternative, self-propelled units and track modules can be retrofit to existing ceilings or overhead structures. For example, track modules can be mounted to existing ceiling structures with brackets or other hardware attached to the top of the track module. Top wall 642 has a mount in the form of a bracket 644 that allows the top wall to be mounted to a T-bar, frame or other overhead support.

Conduit 630 also has a bottom wall 652 opposite top wall 642. Bottom wall 652 defines an inner surface 654 along which track surface 610 extends. Bottom wall 652 defines a large longitudinal slot 656 that extends along the entire length of track module 600. Slot 656 divides bottom wall 652 into two sections, including a first wall section 653 and a second wall section 655. In this arrangement, track surface 610 is also divided into two track sections, namely a first track surface 613 on first wall section 653 and a second track surface 615 on second wall section 655. Slot 656 extends between first track surface 613 and second track surface 615, forming a longitudinal passage 657 adapted to permit a portion of a movable object, such as light element, to move in and long the slot as unit 100 travels along track system 500.

Figure 15:
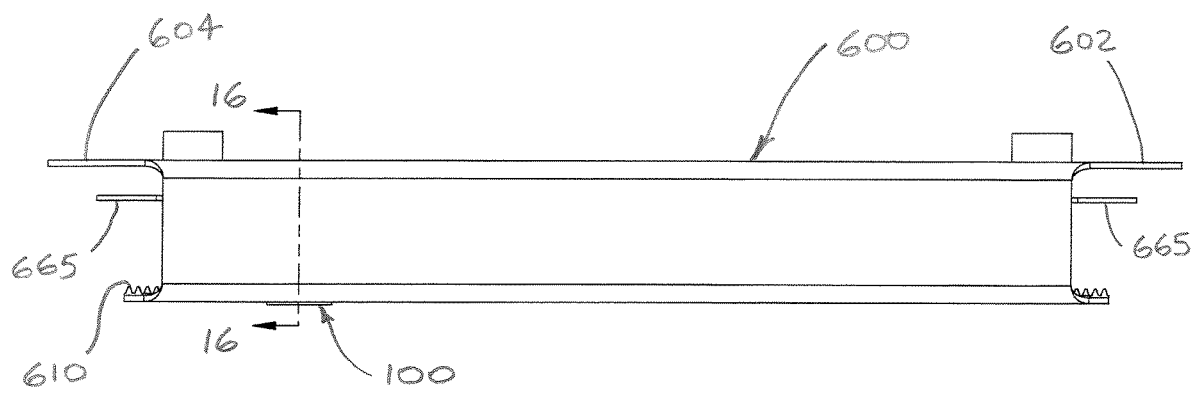
FIG. 15 is a side elevation view of a component of the support structure of FIG. 9, shown with a self-propelled unit positioned at a third location in the support structure.
Figure 16:
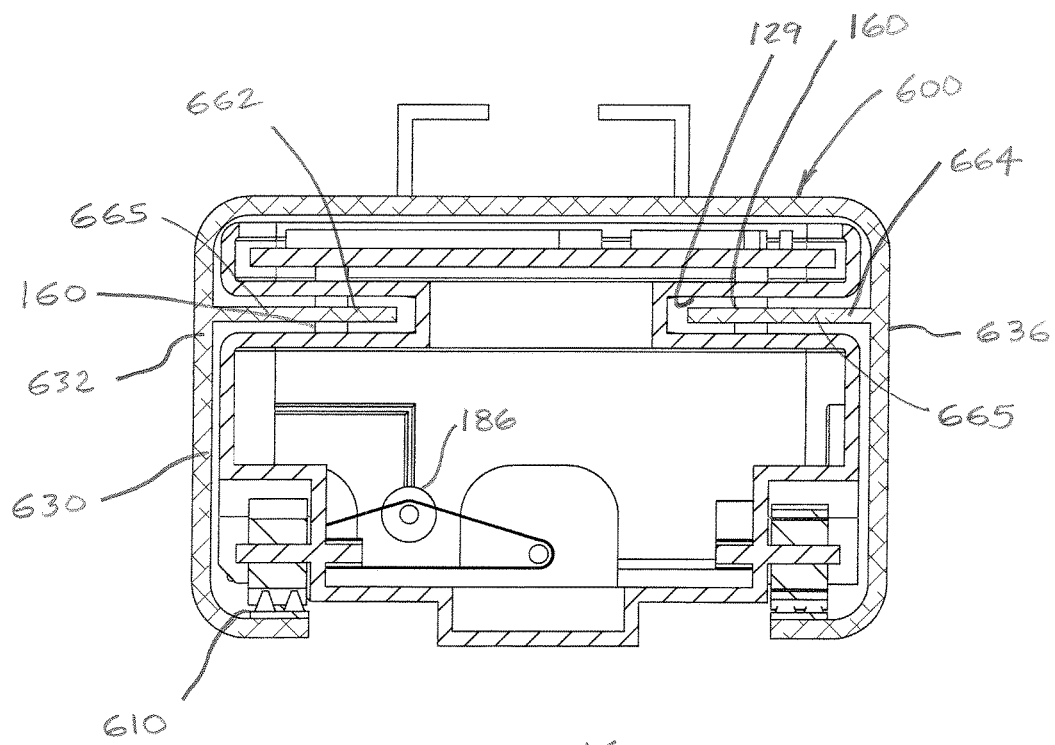
FIG. 16 is a cross section view of the component of the support structure and self-propelled unit of FIG. 15, taken at line 16-16 in FIG. 15.
Figure 17:
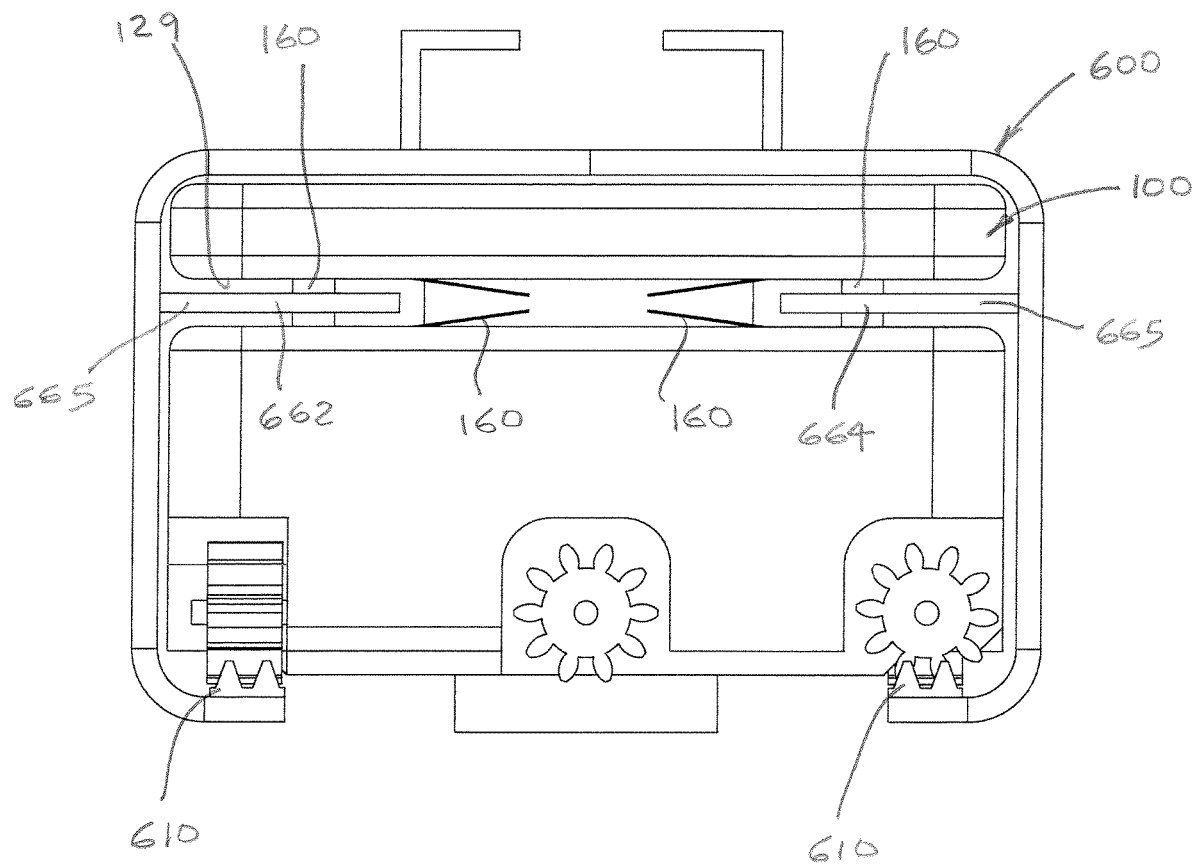
FIG. 17 is an end view of a component of the support structure of FIG. 9 and a self-propelled unit shown inside the component.

Track modules can be connected to a power source and provide electricity to self-propelled units that travel along the track system. Referring to FIGS. 15-17, for example, each track module 600 includes a first electrical contact 662 that extends longitudinally along first sidewall 632 and a second electrical contact 664 that extends longitudinally along second sidewall 636. First electrical contact 662 and second electrical contact 664 are in the form of flanges 665 that are connected to a power supply through the track system. Each flange 665 extends inwardly into the interior of conduit 630. In these positions, flanges 665 align with recess 129 of unit 100. Flanges 665 enter into recess 129 as unit 100 enters track module 600, at which time the first electrical contact 662 and second electrical contact 664 come in contact with contacts 160 inside unit 100. Flanges 665 slidingly engage recess 129 and support self-propelled unit 100 so that the unit is vertically supported at all times, particularly when a section of the unit is suspended over a slot or gap in the track system. When a section of self-propelled unit 100 is positioned over a gap at an intersection, such as in the scenario shown in FIG. 11, flanges 665 are positioned in recess 129 and vertically support the unit so that it maintains proper alignment in and engagement with the track system.

Track systems can be arranged in a number of different grid configurations. For example, grids can be made up of a plurality of interconnected square sections, a plurality of interconnected rectangular sections, a combination of square and rectangular sections, or other geometric arrangements. The length of each side of a square, a rectangle or other shape can depend on numerous factors. Therefore, it can be advantageous to manufacture track modules with different unit lengths, with longer modules being intended for longer sections of track, and shorter modules intended for shorter sections of track. Track systems can be manufactured as kits or assemblies containing one or more different types of track module, each module type having a specific unit length. For example, a first type of track module in the kit can have a unit length of two feet to build a shorter section of track, and a second type of track module in the kit can have a unit length of four feet to build a longer section of track. It will be understood that these unit lengths are just examples, and that other unit lengths can utilized depending on the desired configuration.

Figure 19:
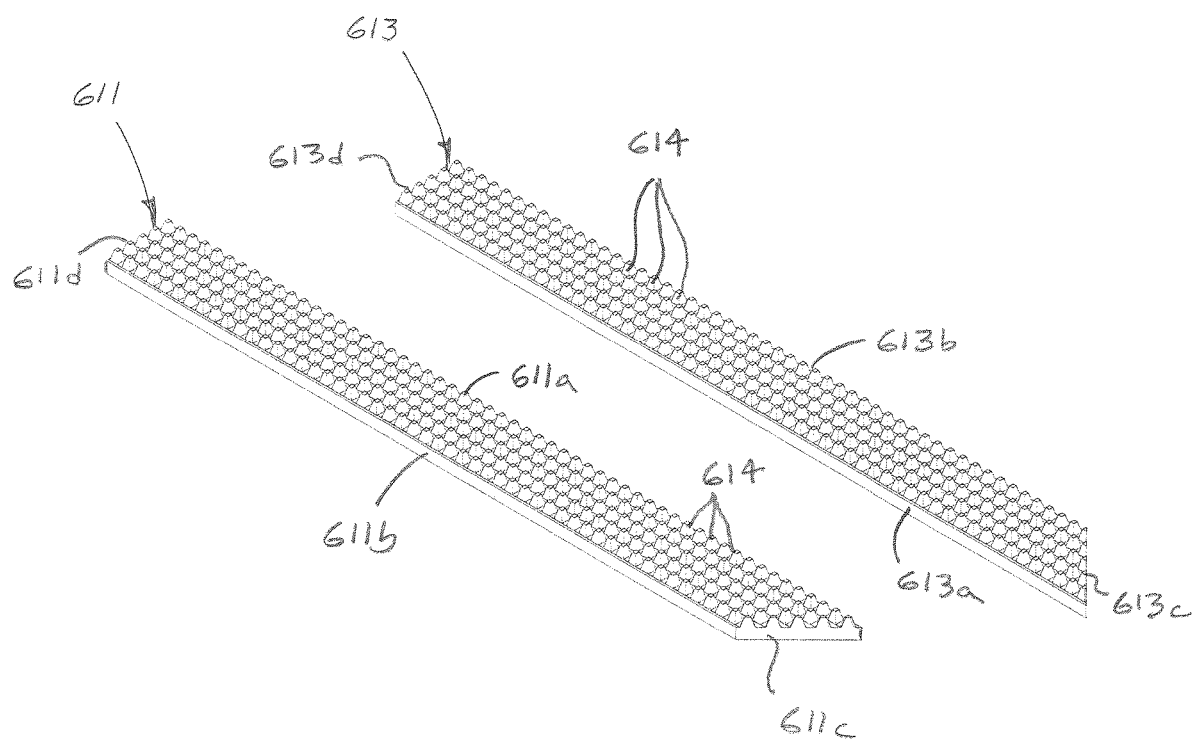
FIG. 19 is a perspective view of two track segments of the support structure of FIG. 9.

It can also be advantageous to manufacture individual track pieces or "track segments" to form track surfaces on or in each track module. For example, track surface 610 in the present example is formed using a series of individual track segments that extend inside track module 600. These track segments provide an economic way to manufacture track modules of different unit lengths, while reducing the number of track part geometries that must be machined so as to accommodate different track module dimensions. Referring to FIG. 19, only two track segments are utilized to make track surface 610. The track segments include a first track segment 611 and a second track segment 613. Track segments 611 and 613 have mirror symmetry with respect to one another. First track segment 611 includes a long side 611a, a short side 611b, a beveled end 611c and a butt end 611d. Second track segment 613 includes a long side 613a, a short side 613b, a beveled end 613c and a butt end 613d.

Each end of first track segment 611 is configured to be joined to another first track segment 611, or to a second track segment 613, depending on the arrangement. Likewise, each end of second track segment 613 is configured to be joined to another second track segment 613 or to a first track segment 611, depending again on the arrangement. For example, beveled end 611c of first track segment 611 can be joined to a beveled end 611c of another first track segment 611 to form a linear connection. Alternatively, beveled end 611c can be joined to a beveled end 613c of a second track segment 611 in a miter joint to form a 90 degree intersection. Similarly, beveled end 613c of second track segment 613 can be joined to a beveled end 613c of another second track segment 613 to form a linear connection. In addition, beveled end 613c can be joined to a beveled end 611c of a first track segment 611 in a miter joint to form a 90 degree intersection. Butt end 611d of first track segment 611 can be joined in a butt joint with either a butt end 611d of another first track segment 611, or with a butt end 613d of a second track segment 613, which in either case forms a linear connection.

Projections 614 are uniformly spaced from one another on their respective track segments in both the X and Y directions. In addition, projections 614 are spaced uniformly from the sides and ends of their respective track segments. Therefore, the pattern and arrangement of projections 614 remains uniform and continuous between adjoined track segments, without interruption. As track surface 610 proceeds from one track segment to the next, the pattern of projections 614 remains uniform and consistent so that self-propelled units, like unit 100, can travel smoothly over adjoined track segments. The gear teeth 180 on each gear can transition smoothly between projections 614 on adjoining track segments so that gears in the active mode do not slip or disengage from track surface 610.

Figure 20:
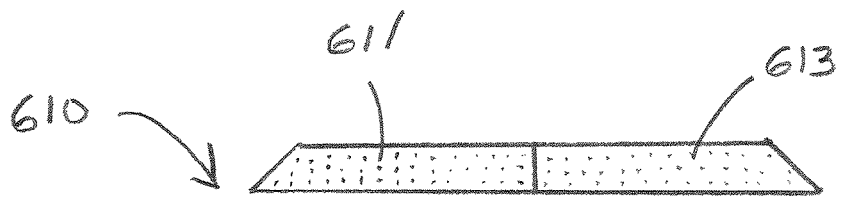
FIG. 20 is a plan view of a first track surface arrangement utilizing multiple track segments of the types shown in FIG. 19.
Figure 20:
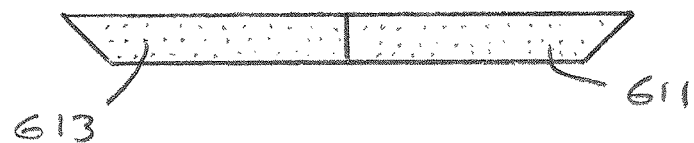
Figure 21:
FIG. 21 is a plan view of a second track surface arrangement utilizing multiple track segments of the types shown in FIG. 19.
Figure 21:
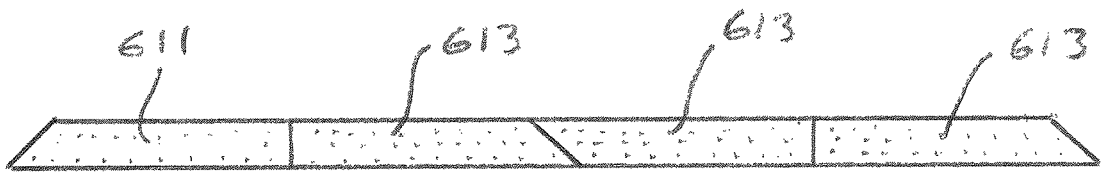
Figure 21:
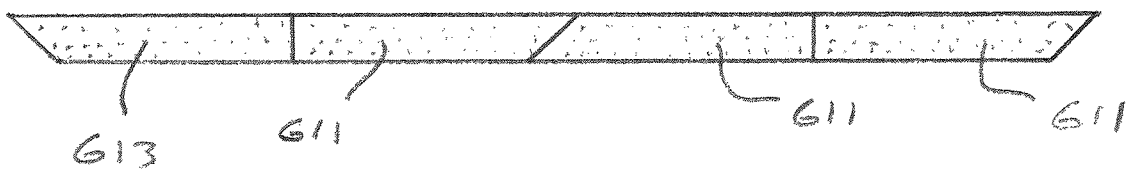

First and second track segments 611 and 613 can be joined end to end in a linear arrangement to create a track surface within a track module. Track segments 611 and 613 associated with separate track modules can also be joined end to end to seamlessly join the two track modules together, either in linear path or at a 90 degree intersection. Moreover, track segments 611 and 613 can be connected in different combinations and arrangements to accommodate different track module lengths. Referring to FIGS. 20 and 21, two examples of track surfaces 610 are shown as they would be arranged on the inside of a track module 600. For clarity, the track surfaces 610 are shown without the rest of the surrounding track module 600. In FIG. 20, a first track segment 611 is joined end to end with a second track segment 613 in a butt joint on each side of track surface 610. Each of track segments 611 and 613 is two feet long, so that track surface 610 is four feet long, to accommodate a track module length of four feet. In FIG. 21, the same type of first track segment 611 and the same type of second track segment 613 are used, albeit in greater numbers, to construct a different track surface 610'. The track section at the top of the Figure is constructed with one first track segment 611 and three second track segments 613. The track section at the bottom of the Figure is constructed with one second track segment 613 and three first track segments 611. Each of first and second track segments 611 and 613 is two feet long, as noted above, so that track surface 610' is eight feet long, to accommodate a track module length of eight feet. As these examples show, first and second track segments 611 and 613 can be joined by butt joints or miter joints in various combinations and arrangements to construct track modules of different lengths. Therefore, track segments 611 and 613 can be used to construct track modules of many different sizes, which offers great flexibility in a cost-effective part design that minimizes the number of track segments required.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. It is intended by the following claims to claim any and all modifications and variations that fall within the true scope of the present concepts.

What is claimed is:

1. A track module comprising:
an elongated body defining a longitudinal axis and comprising two ends, each end comprising at least one beveled edge, and
at least one track surface extending longitudinally along the elongated body, the at least one track surface comprising a plurality of protuberances arranged in rows that are parallel to the longitudinal axis of the elongated body, and in columns that are perpendicular to the longitudinal axis of the elongated body,
the track module configured for connection with another track module to construct a track system that provides two axes of intelligent locomotion for a movable object on the track system,
the track module comprising at least one electrical contact for supplying energy to the movable object on the track system.

2. The track module of claim 1, wherein the at least one beveled edge is oriented at an angle of 45 degrees relative to the longitudinal axis for joining the track module to another identically configured track module end-to-end in a miter joint.

3. The track module of claim 1, wherein the at least one beveled edge of each end comprises a first beveled edge and a second beveled edge that are symmetrical relative to the longitudinal axis.

4. The track module of claim 3, wherein the first beveled edge and the second beveled edge are each oriented at an angle of 45 degrees relative to the longitudinal axis, for joining the track module to at least one other identically configured track module end-to-end in a miter joint.

5. The track module of claim 1, wherein the at least one track surface comprises a first track surface extending longitudinally along a first side of the elongated body, and a second track surface extending longitudinally along a second side of the elongated body.

6. The track module of claim 5, wherein the elongated body defines a longitudinal slot that extends between the first track surface and the second track surface, the longitudinal passage adapted to permit a portion of the movable object to move in the slot as the movable object travels on the track system.

7. The track module of claim 1, wherein the plurality of protuberances comprise a plurality of projections configured to mesh with one or more gears of the movable object to allow the movable object to travel on the at least one track surface along two axes of movement.

8. The track module of claim 1, wherein the elongated body of the track module is a hollow conduit.

9. A track system comprising:
a plurality of track modules connected end-to-end, each track module comprising:
an elongated body defining a longitudinal axis and comprising two ends, each end comprising at least one beveled edge, and
at least one track surface extending longitudinally along the elongated body, the at least one track surface comprising a plurality of protuberances arranged in rows that are parallel to the longitudinal axis of the elongated body, and in columns that are perpendicular to the longitudinal axis of the elongated body,
the track system providing two axes of intelligent locomotion for a movable object on the track system,
wherein each track module comprises at least one electrical contact for supplying energy to the movable object on the track system.

10. The track system of claim 9, wherein the at least one beveled edge on an end of each track module is oriented at an angle of 45 degrees relative to the longitudinal axis of said track module, for joining said track module to another track module of the plurality of track modules end-to-end in a miter joint.

11. The track system of claim 9, wherein the at least one beveled edge of each end comprises a first beveled edge and a second beveled edge that are symmetrical relative to the longitudinal axis.

12. The track system of claim 11, wherein the first beveled edge and the second beveled edge are each oriented at an angle of 45 degrees relative to the longitudinal axis for joining the track module to at least one other track module end-to-end in a miter joint.

13. The track system of claim 9, wherein the at least one track surface of each track module comprises a first track surface extending longitudinally along a first side of the elongated body of said track module, and a second track surface extending longitudinally along a second side of the elongated body of said track module.

14. The track system of claim 13, wherein the elongated body of each track module defines a longitudinal slot that extends between the first track surface and the second track surface, the longitudinal slot adapted to permit a portion of the movable object to move in the slot as the movable object travels on the track system.

15. The track system of claim 9, wherein the plurality of protuberances comprise a plurality of projections configured to mesh with one or more gears of the movable object to allow the movable object to travel on the at least one track surface along two axes of movement.

16. The track system of claim 9, wherein the plurality of track modules are connected in a rectangular grid comprising four corners, each corner being formed by two of the plurality of track modules connected end-to-end in a miter joint.

17. The track system of claim 16, wherein each corner defines a window aperture that provides access into an interior space inside the track system.

18. The track system of claim 9, wherein the elongated body of each track module is a hollow conduit.

* * * * *